(12) United States Patent
Sajadi et al.

(10) Patent No.: US 8,393,740 B2
(45) Date of Patent: Mar. 12, 2013

(54) IMAGE PROJECTION SYSTEM WITH KEYSTONE CORRECTION

(75) Inventors: Seyed Behzad Sajadi, Irvine, CA (US); Yasuhiro Komori, Irvine, CA (US); Hung Khei Huang, Irvine, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 611 days.

(21) Appl. No.: 12/403,316

(22) Filed: Mar. 12, 2009

(65) Prior Publication Data
US 2010/0231811 A1 Sep. 16, 2010

(51) Int. Cl.
*G03B 21/00* (2006.01)
(52) U.S. Cl. ............................. 353/70; 353/69; 353/20
(58) Field of Classification Search ............. 353/69, 353/70; 382/275
See application file for complete search history.

(56) References Cited

U.S. PATENT DOCUMENTS

| | | | |
|---|---|---|---|
| 6,219,011 B1 | 4/2001 | Aloni et al. | 345/1 |
| 6,305,805 B1 | 10/2001 | Liebenow | 353/69 |
| 6,367,933 B1 | 4/2002 | Chen et al. | 353/69 |
| 6,456,339 B1 | 9/2002 | Surati et al. | 348/745 |
| 6,520,647 B2 * | 2/2003 | Raskar | 353/70 |
| 6,618,076 B1 | 9/2003 | Sukthankar et al. | 348/180 |
| 6,709,116 B1 | 3/2004 | Raskar et al. | 353/121 |
| 6,753,907 B1 | 6/2004 | Sukthankar et al. | 348/222.1 |
| 6,755,537 B1 | 6/2004 | Raskar et al. | 353/94 |
| 7,014,323 B2 | 3/2006 | Kobayashi et al. | 353/69 |
| 7,036,940 B2 | 5/2006 | Matsuda et al. | 353/70 |
| 7,119,833 B2 | 10/2006 | Jaynes et al. | 348/189 |
| 7,137,707 B2 | 11/2006 | Beardsley et al. | 353/69 |
| 7,144,115 B2 | 12/2006 | Li | 353/31 |
| 7,150,536 B2 | 12/2006 | Inoue | 353/69 |
| 7,167,645 B2 | 1/2007 | Matsuda et al. | 396/213 |
| 7,175,285 B2 | 2/2007 | Li et al. | 353/70 |
| 7,215,362 B2 | 5/2007 | Klose | 348/189 |
| 7,239,331 B2 | 7/2007 | Chernichenko et al. | 345/647 |
| 7,239,360 B2 | 7/2007 | Bassi et al. | 348/745 |
| 7,262,816 B2 | 8/2007 | McDowall et al. | 348/745 |
| 7,292,269 B2 | 11/2007 | Raskar et al. | 348/207.99 |
| 7,309,133 B2 | 12/2007 | Miyasaka et al. | 353/122 |
| 7,347,564 B2 | 3/2008 | Matsumoto et al. | 353/69 |

(Continued)

OTHER PUBLICATIONS

Sukthankar et al., "Smarter Presentations: Exploiting Homography in Camera-Projector Systems", Eighth International Conference on Computer Vision, vol. 1, 2001, pp. 247-253.

(Continued)

*Primary Examiner* — Francis M Legasse, Jr.
*Assistant Examiner* — Jerry Brooks
(74) *Attorney, Agent, or Firm* — Fitzpatrick, Cella, Harper & Scinto

(57) ABSTRACT

Keystone correction for a projector. An uncorrected graphic is displayed on a display unit utilizing pixels. The uncorrected graphic is projected from the display unit onto a projection screen to form an uncorrected image. An orientation of the uncorrected image relative to the projection screen is captured. The uncorrected graphic is transformed into a pre-distorted graphic for projection from the display unit onto the projection screen so as to form a corrected image with an orientation more aligned with the projection screen than the orientation of the uncorrected image and such that the pre-distorted graphic utilizes more pixels in the display unit than a second pre-distorted graphic, wherein if formed, would be formed by transforming the uncorrected graphic such that the second pre-distorted graphic forms a second corrected image with a maximum rectangular area inside the uncorrected image when projected from the display unit onto the projection screen.

19 Claims, 11 Drawing Sheets

U.S. PATENT DOCUMENTS

| | | | | |
|---|---|---|---|---|
| 7,352,913 B2 * | 4/2008 | Karuta et al. | ............ | 382/275 |
| 7,380,946 B1 | 6/2008 | Teng et al. | ............ | 353/69 |
| 7,401,929 B2 | 7/2008 | Matsumoto et al. | ............ | 353/70 |
| 7,419,268 B2 | 9/2008 | Kobayashi | ............ | 353/69 |
| 7,808,513 B1 * | 10/2010 | Teng | ............ | 345/647 |
| 2006/0152682 A1 | 7/2006 | Matsuda et al. | ............ | 353/40 |
| 2007/0242233 A1 | 10/2007 | Sokeila et al. | ............ | 353/69 |
| 2007/0291184 A1 | 12/2007 | Harville et al. | ............ | 348/745 |

OTHER PUBLICATIONS

Sukthankar et al., "Automatic Keystone Correction for Camera-assisted Presentation Interfaces", Proceedings of International Conference on Multimedia Interfaces, Oct. 2000, pp. 1-9.

Chen et al., "Scalable Alignment of Large-Format Multi-Projector Displays Using Camera Homography Trees", IEEE Visualization, Oct. 27-Nov. 1, 2002, pp. 339-346.

Sukthankar et al., "Self-Calibrating Camera-Assisted Presentation Interface", Proceedings of International Conference on Control, Automation, Robotics and Vision, 2000.

Raskar et al., "A Self Correcting Projector", Proceedings of 2001 IEEE Computer Society Conference on Computer Vision and Pattern Recognition, vol. 2, Dec. 2001, pp. 504-508.

Okatani et al., "Autocalibration of a Projector-Screen-Camera System: Theory and Algorithm for Screen-to-Camera Homography Estimation" Ninth IEEE International Conference on Computer Vision, vol. 2, 2003, pp. 774-781.

Okatani et al, "Autocalibration of a Projector-Camera System", IEEE Transactions on Pattern Analysis and Machine Intelligence, vol. 27, Dec. 2005, pp. 1845-1855.

Li et al., "Automatic Keystone Correction for Smart Projectors With Embedded Camera", 2004 International Conference on Image Processing, vol. 4, Oct. 2004, pp. 2829-2832.

Yang et al., "PixelFlex: A Reconfigurable Multi-Projector Display System", IEEE Visualization, Oct. 2001.

Nakamura et al., "Active Projector: Image correction for moving image over uneven screens", UIST '02 Companion—Posters, 2002, http://www.acm.org/uist/archive/adjunct/2002/pdf/posters/p01-nakamura.pdf.

Chen et al., "Automatic Alignment of High-Resolution Multi-Projector Displays Using an Un-Calibrated Camera", IEEE Visualization, Oct. 2000, pp. 125-130.

C. Pinhanez, "The Everywhere Displays Projector: A Device to Create Ubiquitous Graphical Interfaces", Lecture Notes in Computer Science, vol. 2201, Proceedings of the Third International Conference on Ubiquitous Computing, 2001, pp. 315-331.

* cited by examiner

IMAGE PROJECTION SYSTEM WITH KEYSTONE CORRECTION

FIELD

The present disclosure relates to an image projection system which projects images in accordance with a video signal, such as a video signal generated by a host computer, and more particularly relates to an image projection system that performs keystone correction.

BACKGROUND

Digital projectors are widely used for business and classroom presentations, as well as for home entertainment applications. A digital projector receives a video signal from a host computer or other video source, such as a DVD player, and displays a graphic using a display unit within the digital projector in accordance with the video signal. Display units may include pixel displays such as liquid crystal display (LCD) chips, liquid crystal on silicon (LCOS) chips, or digital micromirror device (DMD) chips. The graphic is then projected from the display unit onto a projection screen using a light source and lens system, so as to form a projected image on the projection screen.

In ideal conditions, the digital projector projects the graphic onto the projection screen along a projection axis that is perpendicular to the projection screen to form an image on the projection screen. In such ideal conditions, there is minimal keystone distortion and the proportions of the image are generally similar to the proportions of the graphic displayed by the display unit.

Keystone distortion occurs when the projection axis is not perpendicular to the projection screen due to the position of the digital projector relative to the projection screen. Keystone distortion causes an image to have a stretched, often trapezoidal appearance on the projection screen. Thus, the proportions of an image with keystone distortion are not similar to the proportions of the graphic displayed by the display unit.

It has generally been considered to provide keystone correction capabilities in a digital projector. Consistent with keystone correction capabilities, a graphic is projected from the display unit onto a projection screen to form an image having keystone distortion. A transformation is then applied to the graphic so that the graphic is displayed on the display unit with a pre-distortion that is the inverse of the keystone distortion. As a result, when the pre-distorted graphic is projected onto the projection screen to form an image, the resulting projected image is aligned with the projection screen.

The transformation is often entered manually by the user, who selects the transformation in a trial-and-error process.

SUMMARY

One problem encountered with keystone correction is that the resolution of a keystone-corrected image on the projection screen suffers because the pre-distorted graphic utilizes less area than the original graphic, and consequently utilizes fewer pixels of the display unit. Although there are multiple sets of pre-distorted graphics that will decrease keystone distortion for a given image on the projection screen, conventional keystone corrections fail to generate a transformation for a pre-distorted graphic that takes into account the number of pixels utilized in displaying the pre-distorted graphic.

The foregoing situation is addressed through the provision of an image projection system that performs keystone correction while considering the number of pixels utilized in the display unit in displaying the pre-distorted graphic. Through calculations that seek to both improve the alignment of the projected image with the projection screen and increase the number of pixels utilized in displaying the pre-distorted graphic, a transformation for pre-distortion of the graphic is devised that decreases keystone distortion while ameliorating the loss of resolution typically associated with keystone correction.

In an example embodiment described herein, a projector includes a display unit including a plurality of pixels to display an uncorrected graphic and a pre-distorted graphic for projection onto a projection screen to form an uncorrected image and a corrected image respectively. A capture device captures an orientation of the uncorrected image relative to the projection screen. A control unit controls the projector to project the uncorrected graphic from the display unit and controls the capture device to capture the orientation of the uncorrected image relative to the projection screen. The control unit thereafter derives a transformation which is applied by the control unit so as to transform the uncorrected graphic into the pre-distorted graphic. The transformation is such that the corrected image counterpart to the pre-distorted graphic has an orientation more aligned with the projection screen than the orientation of the uncorrected image and such that the pre-distorted graphic utilizes more pixels in the display unit than a second pre-distorted graphic, which might or might not be actually formed, but if formed, would be formed as follows: the second pre-distorted graphic would be formed by transforming the uncorrected graphic so that the second pre-distorted graphic forms a second corrected image with a maximum rectangular area inside the uncorrected image when projected from the display unit onto the projection screen. The control unit then controls the projector to project the pre-distorted graphic from the display unit onto the projection screen to form the corrected image. The transformation is thereafter applied to graphics received from a host computer, such as graphics corresponding to a PowerPoint presentation.

In a further example embodiment, the control unit derives the transformation such that the transformation transforms the uncorrected graphic into the pre-distorted graphic so as to maximize a number of pixels in the display unit utilized to display the pre-distorted graphic. The maximization of the number of pixels utilized to display the pre-distorted graphic maximizes the resolution of the resulting corrected image on the projection screen.

In another example embodiment, the control unit derives the transformation such that the transformation transforms the uncorrected graphic into the pre-distorted graphic so as to maximize a product of a first area fraction representing a projection area aligned with the projection screen, and a second area fraction representing pixels utilized in displaying the pre-distorted graphic. This product allows for consideration of both the size and resolution of the corrected image counterpart.

This brief summary has been provided so that the nature of the disclosure may be understood quickly. A more complete understanding of the invention can be obtained by reference to the following detailed description of the preferred embodiment thereof in connection with the attached drawings.

DETAILED DESCRIPTION

First Embodiment

Figure 1:
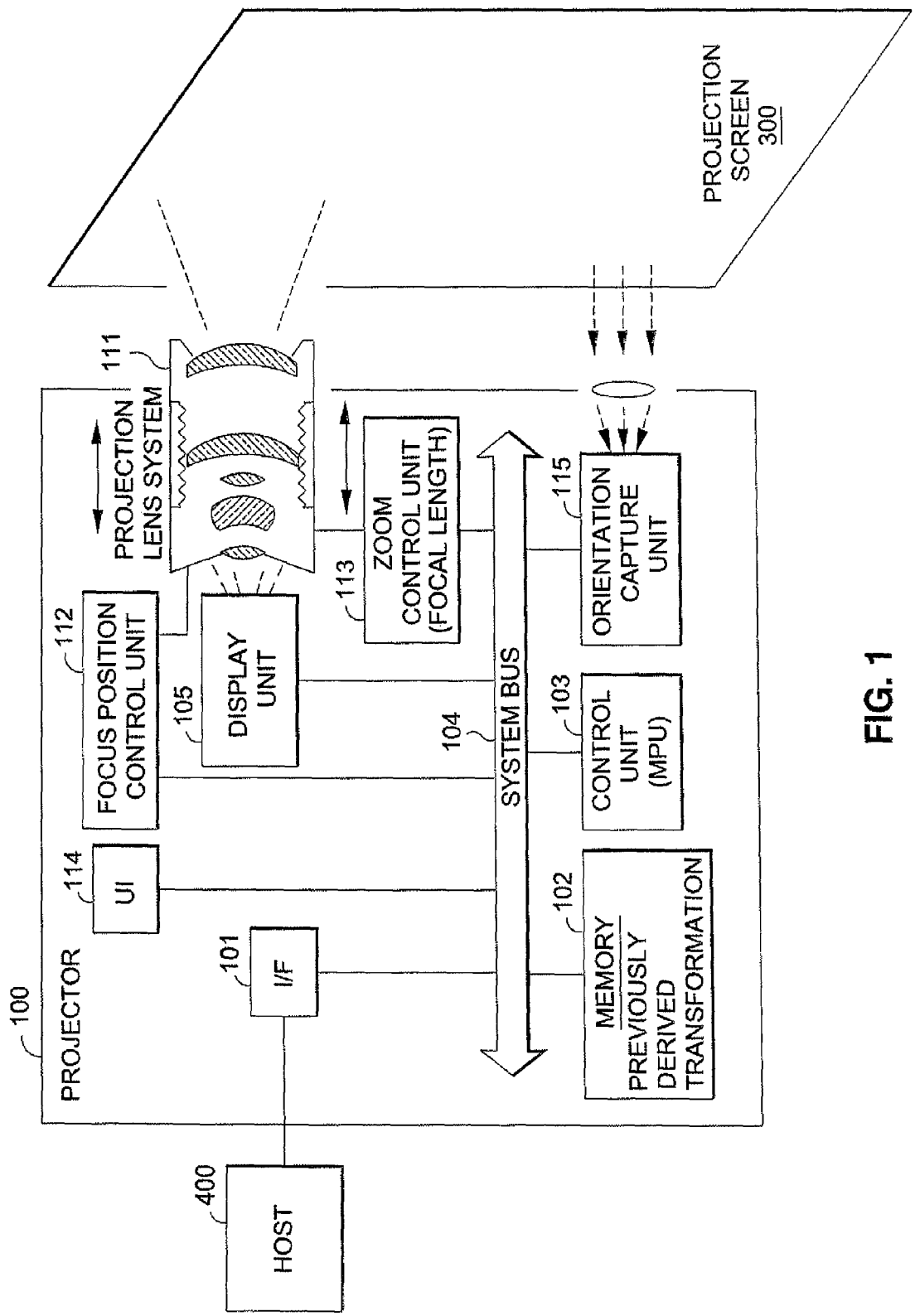
FIG. 1 illustrates a first example embodiment of a digital projector connected to a host for projecting an image onto a projection screen.

FIG. 1 illustrates a first example embodiment. Projector 100 is constructed so as to receive image data from host 400 and project an image onto projection screen 300 in accordance with the image data received from host 400. Host 400 may include any device capable of transmitting image data to projector 100, such as, a laptop PC, desktop PC, DVD player, camcorder, or digital camera. Projector 100 may include, for example, an LCD projector, DLP projector, LCOS projector, or LED projector.

As shown in FIG. 1, projector 100 includes an interface unit (I/F) 101 for receiving data from host 400. Interface unit 101 is coupled to control unit 103 via system bus 104. Control unit 103 is also coupled to memory 102 which is constructed for storing data, such as previously derived transformations in accordance with this disclosure.

Projector 100 also includes display unit 105 which is coupled to control unit 103 via system bus 104. Display unit 105 includes an interface that facilitates communication with control unit 103. In addition, control unit 103 includes an interface for communicating with display unit 105.

Display unit 105 is constructed for displaying a graphic in accordance with image data received from host 400 or from memory 102. Display unit 105 displays a graphic by using a pixel display within display unit 105. Alternative embodiments may include multiple pixel displays to display red, green and blue components of a graphic.

Figure 2:
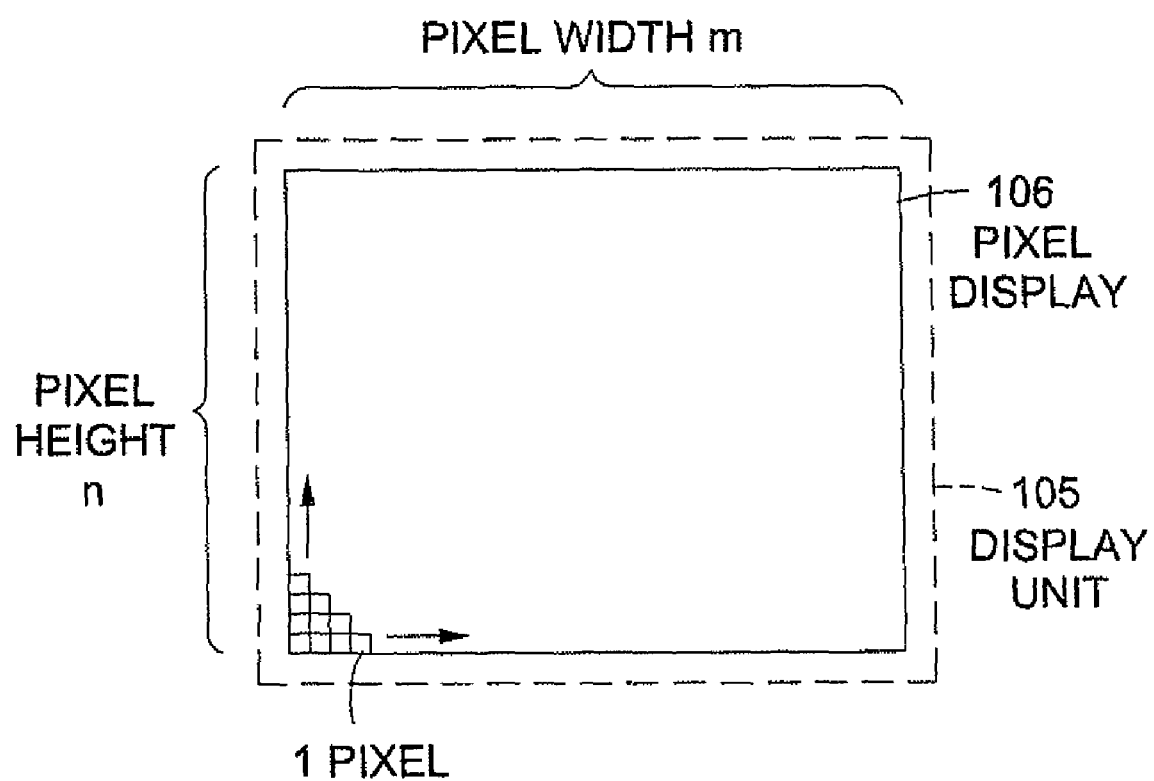
FIG. 2 illustrates an example pixel display inside the display unit of the digital projector of FIG. 1.

FIG. 2 illustrates pixel display 106 located inside display unit 105. The available pixel area of pixel display 106 is defined by a plurality of pixels arranged in rows and columns that aggregate to a total available pixel area of m columns and n rows. Each pixel of pixel display 106 is addressable and is constructed be electrically energized or de-energized to either block light or allow light to pass through pixel display 106. The energizing of pixels allows pixel display 106 to display a graphic.

The total available pixel area of pixel display 106 determines a native resolution of projector 100. When a native resolution is expressed as m×n pixels, some possible resolutions of projector 100 may include 800×600, 1024×768 or 1280×720. Generally, the larger the available pixel area of pixel display 106, the higher the native resolution of projector 100.

Returning to FIG. 1, projection lens system 111 is constructed with multiple lenses to focus light emitted by display unit 105. Projection lens system 111 is also arranged mechanically to allow for adjustable focus position and for adjustable zoom (focal length). The lenses in projection lens system 111 may include a combination of fixed lenses and adjustable lenses that reposition axially. In operation, the magnification of a projected image can be changed by repositioning a zoom lens in projection lens system 111. As the zoom lens moves, the focal length of projection lens system 111 changes, and a focus lens may be repositioned to keep the projected image sufficiently in focus. Additionally, a projected image can be focused by adjusting the focus position of a focus lens or multiple focus lenses.

Projection lens system 111 is connected to both focus position control unit 112 for adjusting the focus position of projection lens system 111, and zoom control unit 113 for adjusting the focal length of projection lens system 111. Focus position control unit 112 and zoom control unit 113 may include servo motors or a system of gears and cams to drive various lenses within projection lens system 111 to new positions. Focus position control unit 112 and zoom control unit 113 are coupled to control unit 103 via system bus 104, and are constructed to receive commands from control unit 103 to reposition lenses in projection lens system 111.

Control unit 103 is also coupled to user interface (UI) 114 via system bus 104. User interface 114 is constructed for receiving user input, such as zoom and focus commands. User interface 114 may also include a display for displaying menus and information pertaining to the operation of projector 100.

As shown in FIG. 1, projector 100 also includes orientation capture unit 115 which is coupled to control unit 103 via system bus 104. Orientation capture unit 115 is constructed for capturing images from projection screen 300 and is controlled by control unit 103. In addition, orientation capture unit 115 includes an interface for communicating with control unit 103 and control unit 103 similarly includes an interface for communicating with orientation capture unit 115. Orientation capture unit 115 may include a camera with autofocus set on the sharp boundaries of projection screen 300 or a pinhole camera that is generally in-focus for most distances from projector 100. In alternative embodiments, orientation capture unit 115 may be integrated with user interface 114 to allow a user to select points in a projected image to capture an orientation of the projected image relative to the projection screen.

In accordance with an example embodiment of the present disclosure, interface 101 receives image data from host 400. The received image data is then processed by control unit 103, which controls display unit 105 to display a graphic on pixel display 106. The displayed graphic is then projected by projection lens system 111 to project an image onto projection screen 300 corresponding to the image data received from host 400.

After projecting the image onto projection screen 300, control unit 103 controls orientation capture unit 115 to capture an orientation of the projected image relative to projection screen 300. Control unit 103 then derives a transformation for pre-distorting the graphic displayed by pixel display 106, so as to better align the projected image with projection screen 300. In addition, control unit 103 considers the number of pixels in pixel display 106 that would be available in displaying a pre-distorted graphic. Exemplary derivations of such a transformation are described in more detail below with reference to FIGS. 5 and 8.

After deriving the transformation, control unit 103 applies the transformation to the displayed graphic to obtain the pre-distorted graphic, and controls display unit 105 to display the pre-distorted graphic on pixel display 106. The graphic displayed by display unit 105 is then projected by projection lens system 111 to form a keystone corrected image on projection screen 300.

Figure 3A:
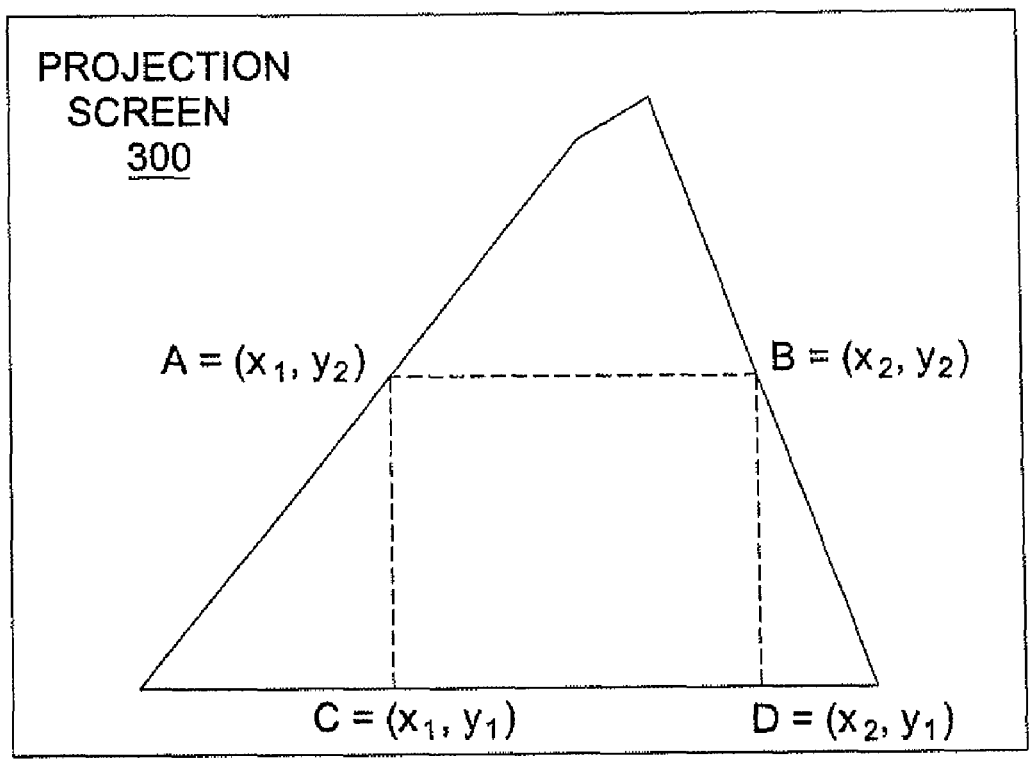
FIG. 3A illustrates an example of the boundaries of a keystone corrected image when keystone correction is performed by increasing an area aligned with the projection screen.

FIG. 3A shows an example of two images projected by projector 100 onto projection screen 300. The outline of the first image is indicated by the solid line forming a non-rectangular quadrilateral. This image is an example of a projected image with keystone distortion. The keystone-distorted image is formed by utilizing the full available pixel area of pixel display 106 to display a graphic at display unit 105, and then by projecting the graphic onto projection screen 300 via projection lens system 111. The keystone-distorted image of FIG. 3A illustrates a relatively large amount of keystone distortion in a vertical direction. Generally, as one side of a projected image becomes more narrow in relation to the opposite side of the projected image, this indicates a larger amount of keystone distortion in a given direction.

The outline of the second image is indicated by the dashed line forming rectangle ABCD. The second image is an example of a keystone corrected image after performing keystone correction for the first image. The corrected image indicated by rectangle ABCD is aligned with projection screen 300 in that segments AB and CD are nearly parallel to the horizontal edges of projection screen 300, and segments AC and BD are nearly parallel to the vertical edges of projection screen 300.

In order to align the uncorrected image with projection screen 300, control unit 103 derives a transformation that pre-distorts an uncorrected graphic corresponding to the solid line, uncorrected image. When the pre-distorted graphic is displayed by display unit 105 and projected by projector 100, the resulting projected image forms rectangle ABCD that is more aligned with projection screen 300.

The projected area of the keystone corrected image, ABCD, generally may not exceed the projected area of the uncorrected image for a given focal length of projection lens system 111. This is a result of the graphic for the uncorrected image being formed by utilizing the full available pixel area of pixel display 106 in display unit 105. Accordingly, any pre-distortion applied to the graphic may not utilize a larger pixel area used to display the original uncorrected graphic.

Although there are multiple rectangular areas that could align with projection screen 300 while fitting within the uncorrected image, in the example of FIG. 3A, keystone correction is performed by deriving a transformation that maximizes the area of rectangle ABCD on projection screen 300.

The transformation is derived after control unit 103 controls orientation capture unit 115 to capture an orientation of the uncorrected image relative to projection screen 300. This may be accomplished by capturing an image including both the uncorrected image and projection screen 300. Control unit 103 may then form a coordinate system aligned with the edges of projection screen 300, which can be sensed, for example, by comparing luminance values of the image. The corners of rectangle ABCD can then be assigned variables within the aligned coordinate system as indicated in FIG. 3A with: A=(x1, y2); B=(x2, y2); C=(x1, y1); and D=(x2,y1).

In addition, the corners of the uncorrected image are assigned fixed values in the aligned coordinate system. These fixed coordinates are then used to derive first order equations for the lines coincident to the edges of the uncorrected image in terms of x and y so that rectangle ABCD may be expanded within the uncorrected image to maximize the area of the corrected image. The slope and y-axis intercept of each of the coincident lines can be found from the fixed coordinates of the two corners forming an edge of the uncorrected image.

With the equations for the coincident lines, y1 and y2 can be expressed in terms of x1 or x2. This is due to the lemma that a fully expanded rectangle within the uncorrected image should have at least three corners on the boundaries of the uncorrected image. Otherwise, the rectangle may still be expanded in one or more directions. This lemma provides that at least three of the coordinates for A, B, C and D lie on at least three of the coincident lines. Consequently, both y1 and y2 may be written in terms of x1 or x2, because any three points of A, B, C and D will include x1, x2, y1 and y2. Furthermore, because of the rectangular shape of ABCD, when using the equations for the coincident lines, y1 evaluated at x1, equals y1 evaluated at x2. Similarly, y2 evaluated at x1, equals y2 evaluated at x2. In this manner, control unit 103 may use these relationships to expand either line x=x1 or x=x2, and express the coordinates of ABCD in terms of either x1 or x2. Out of these two formulations for rectangle ABCD, one written in terms of x1 and the other written in terms of x2, either both will generate the same rectangle when fully expanded for a given x1 or x2, or only one of the formulations will specify a valid rectangle for a given x1 or x2.

To fully expand an aligned rectangle within the uncorrected image, the area of ABCD may first be expressed as (x2−x1)·(y2−y1). In addition, this expression may also be written in terms of x1 or x2 given that x1, x2, y1 and y2 may be written in terms of either x1 or x2. Control unit 103 can then find coordinates of ABCD that correspond to a maximum area of rectangle ABCD by setting the derivative of (x2−x1)·(y2−y1) equal to 0 and solving for x1 or x2. Given that the expansion of either line x=x1 or x=x2 will create the same rectangle or only one valid rectangle, control unit 103 may only need to solve for one of x1 or x2.

After control unit 103 has determined the coordinates for rectangle ABCD that provide the largest area, the coordinates of the four corners of the uncorrected image may then be used to generate a 3×3 homography matrix to map the coordinates of ABCD to a coordinate system representing the pixel area of pixel display 106 in display unit 105. In determining a homography matrix, each of the corners of the uncorrected image may be expressed in a homogenous vector form, such as $$\bar{q} = \begin{bmatrix} x \\ y \\ 1 \end{bmatrix}.$$

Similarly, each of the corners of the pixel area may also be expressed in homogenous vector form as $$\bar{q}' = \begin{bmatrix} x' \\ y' \\ 1 \end{bmatrix}.$$

If the homography matrix is represented as H, then q'=Hq, where $$H = \begin{bmatrix} h11 & h12 & h13 \\ h21 & h22 & h23 \\ h31 & h32 & h33 \end{bmatrix}.$$

Evaluating H requires four pairs of corresponding points from the two coordinate systems. In this case, the coordinates of the fixed corners of the uncorrected image correspond to the four corners of the pixel area of pixel display 106. With reference to FIG. 2, the four corners of the pixel area are: (0,n), (m,n), (0,0) and (n,0). Given that vectors q' and Hq have the same direction, it follows that q'×Hq=0. From solving this equation using the four pairs of corresponding points, homography matrix H can be determined by control unit 103.

After homography matrix H has been determined, points A, B, C and D are mapped to the pixel area coordinate system. The application of homography matrix H provides that the homogeneous coordinate of A is expressed as:
(h11·x1+h12·y2+h13, h21·x1+h22·y2+h23, h31·x1+h32·y2+h33), and the non-homogeneous coordinate of A' is expressed as:
((h11·x1+h12·y2+h13)÷(h31·x1+h32·y2+h33),(h21·x1+h22·y2+h23)÷(h31·x1+h32·y2+h33)). The coordinates of B', C' and D' may be formulated in terms of x1, x2, y1 and y2 in the same way.

Figure 3B:
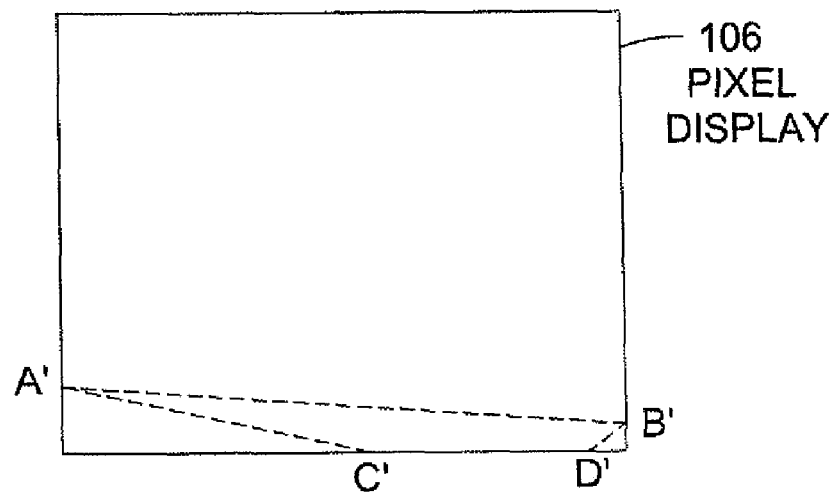
FIG. 3B illustrates an example of pixel utilization corresponding to the keystone correction of FIG. 3A.

FIG. 3B shows the outline of a pre-distorted graphic, quadrilateral A'B'C'D', displayed by pixel display 106 that corresponds to the mapped coordinates of rectangle ABCD). FIG. 3B also shows the outline of an uncorrected graphic, which is represented by the solid line boundary of pixel display 106. As shown in FIG. 3B, quadrilateral A'B'C'D' does not utilize the full available pixel area of pixel display 106, and therefore results in a lower resolution of a graphic formed within quadrilateral A'B'C'D', because such a graphic would utilize less pixels in pixel display 106 than the full pixel area of pixel display 106.

Once quadrilateral A'B'C'D' has been mapped into the pixel area coordinate system, a second homography matrix may then be determined by control unit 103 to transform an uncorrected graphic utilizing the full pixel area of pixel display 106 into a pre-distorted graphic fitting within quadrilateral A'B'C'D'. This second homography matrix may be determined by relating the four corners of the pixel area of pixel display 106 to the coordinates of A'B'C'D'. After deriving the transformation, control unit 103 applies the transformation to the uncorrected graphic to obtain the pre-distorted graphic. In addition, control unit 103 may store the transformation in memory 102 in order to apply the transformation to other graphics displayed by display unit 105.

Figure 4A:
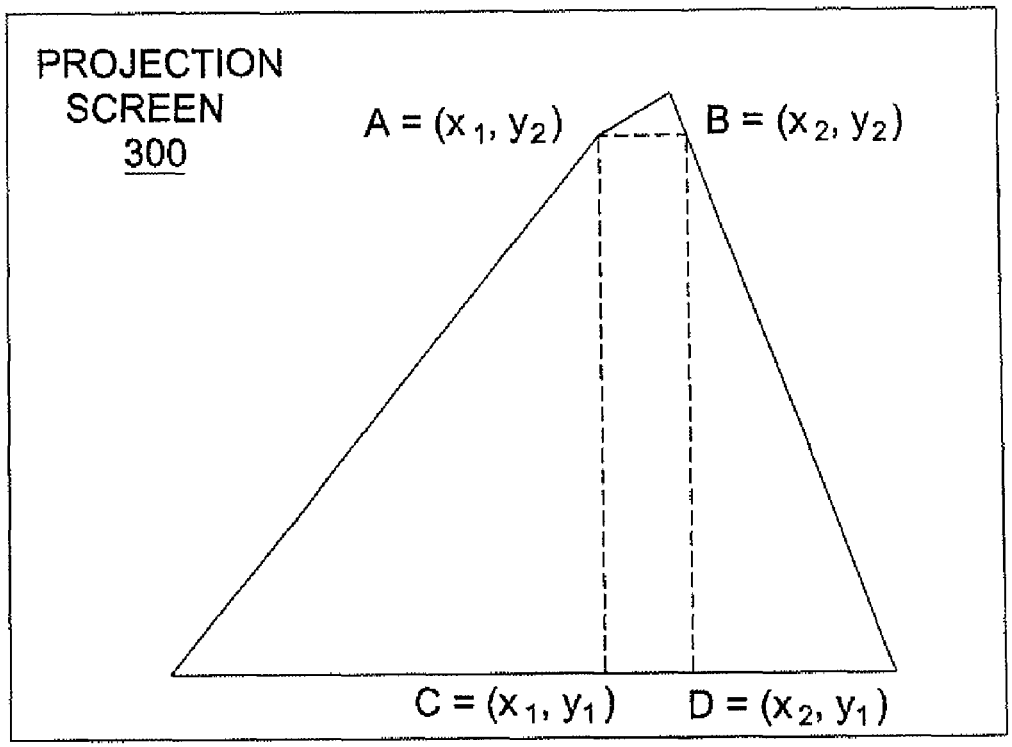
FIG. 4A illustrates an example of the boundaries of a keystone corrected image when keystone correction is performed by increasing pixel utilization.

FIG. 4A shows an example of the uncorrected image of FIG. 3A and a different corrected image projected by projector 100 onto projection screen 300. As with FIG. 3A, the outline of the uncorrected image is indicated by the solid line forming a non-rectangular quadrilateral and represents the utilization of the full available pixel area of pixel display 106.

Also as in FIG. 3A, the outline of the corrected image is indicated by a dashed line forming rectangle ABCD, which has corners represented by variable coordinates in a coordinate system aligned with projection screen 300. However, unlike FIG. 3A, rectangle ABCD is not formed as a result of maximizing the area of rectangle ABCD on projection screen 300. Instead, rectangle ABCD is formed as a result of increasing the pixel area utilized in displaying a corresponding pre-distorted graphic.

Figure 4B:
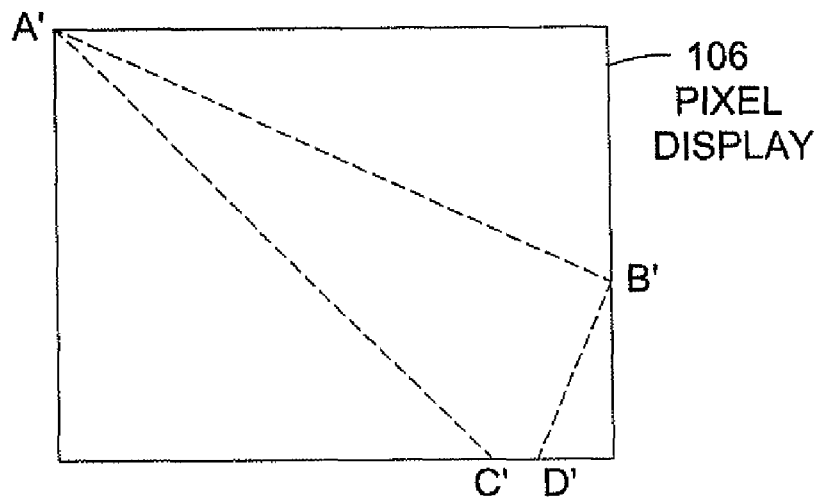
FIG. 4B illustrates an example of pixel utilization corresponding to the keystone correction of FIG. 4A.

FIG. 4B shows the outline of a pre-distorted graphic, quadrilateral A'B'C'D', displayed by pixel display 106 that corresponds to rectangle ABCD in FIG. 4A. Although quadrilateral A'B'C'D' does not utilize the full available pixel area of pixel display 106, the pixel area of A'B'C'D' has been increased in relation to the pixel area utilized by A'B'C'D' in FIG. 3B. This increase in pixel utilization allows for a higher resolution of the corrected image outlined by ABCD in FIG. 4A.

Figure 5:
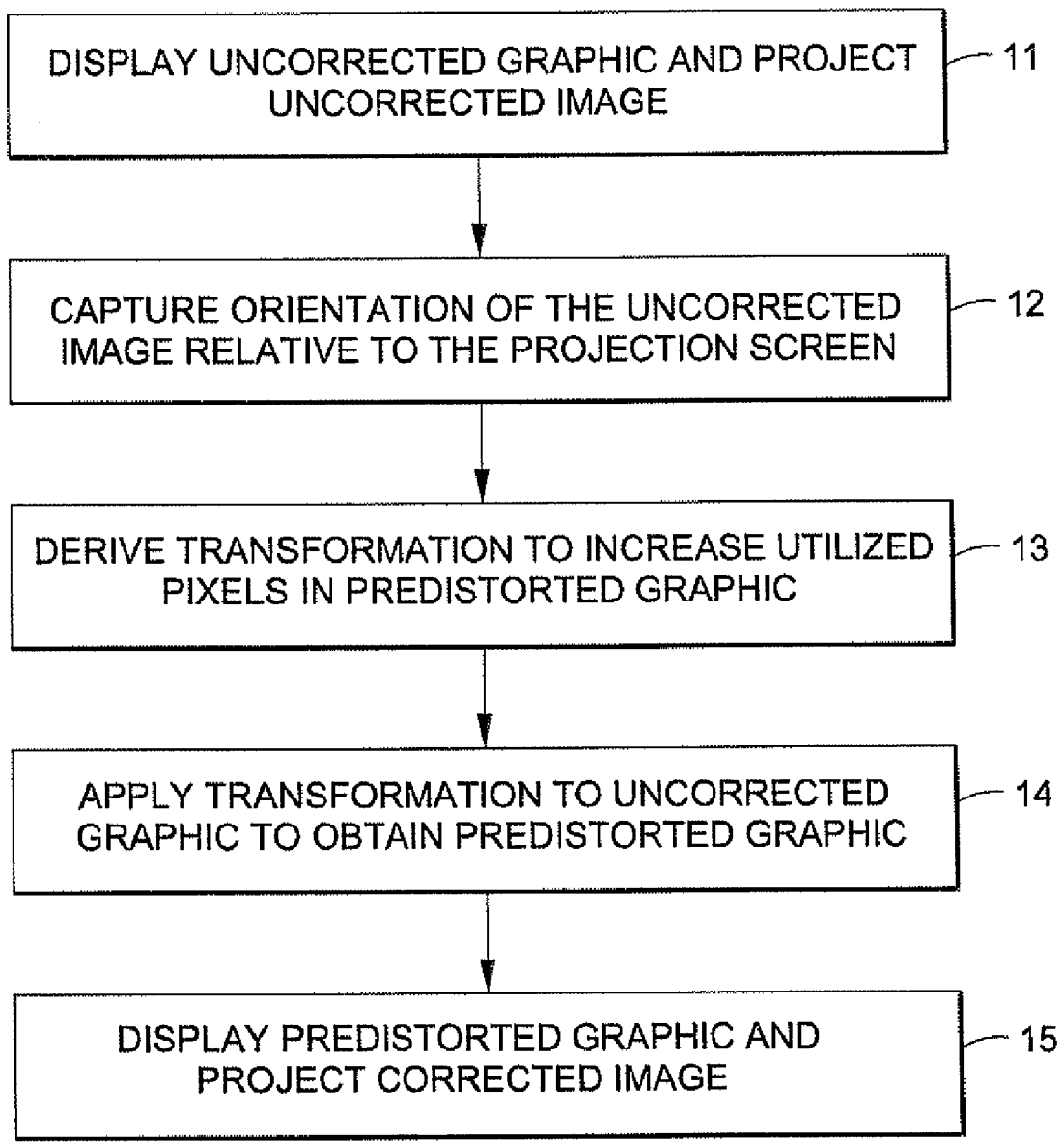
FIG. 5 is a flowchart illustrating an exemplary keystone correction process for the first embodiment corresponding to FIGS. 4A and 4B.

FIG. 5 is an exemplary keystone correction process in projector 100 corresponding to the keystone correction of FIGS. 4A and 4B. Briefly, according to the process steps shown in FIG. 5, projector 100 displays an uncorrected graphic at display unit 105 and projects the uncorrected graphic through projection lens system 111 to form an uncorrected image on projection screen 300. Orientation capture unit 115 then captures the orientation of the uncorrected image relative to projection screen 300. Control unit 103 derives a transformation to transform the uncorrected graphic into a pre-distorted graphic so that a corrected image counterpart is more aligned with projection screen 300, while utilizing a larger pixel area in displaying the pre-distorted graphic than the pixel area outlined in FIG. 3B. Control unit 103 then applies the derived transformation to the uncorrected graphic and controls display unit 105 to display the pre-distorted graphic. The pre-distorted graphic is then projected by projector 100 to form a corrected image on projection screen 300.

In more detail, in step 11, control unit 103 causes display unit 105 to display an uncorrected graphic in accordance with image data received from host 400. The uncorrected graphic is then projected via projection lens system 111 onto projection screen 300 to form an uncorrected image.

In step 12, control unit 103 sends an orientation capture command to orientation capture unit 115. Orientation capture unit 115 then captures an orientation of the uncorrected image relative to projection screen 300. This may be accomplished by capturing an image including both the uncorrected image and projection screen 300. The orientation is then stored in memory 102.

In step 13, control unit 103 derives a transformation to distort the uncorrected graphic into a pre-distorted graphic. Control unit 103 accesses the orientation of the uncorrected image relative to the projection screen 300 from memory 102 and generates a coordinate system aligned with the edges of projection screen 300. The corners of an aligned rectangle ABCD, as described in FIG. 4A, are then assigned variables within the aligned coordinate system, such as: A=(x1,y2); B=(x2,y2); C (x1,y1); and D=(x2,y1).

In addition, the corners of the uncorrected image are assigned fixed values in the aligned coordinate system. With the equations for the coincident lines, y1 and y2 can be expressed in terms of x1 or x2, as discussed above in reference to FIG. 3A.

The coordinates of the four corners of the uncorrected image are also used to generate a 3×3 homography matrix, to map coordinates in the aligned coordinate system to a coordinate system representing the pixel area of pixel display 106. The homography matrix, H may be expressed as $$H = \begin{bmatrix} h11 & h12 & h13 \\ h21 & h22 & h23 \\ h31 & h32 & h33 \end{bmatrix},$$

where a coordinate of quadrilateral A'B'C'D' of FIG. 4B, such as A', may be expressed as A'=AH.

Figure 6A:
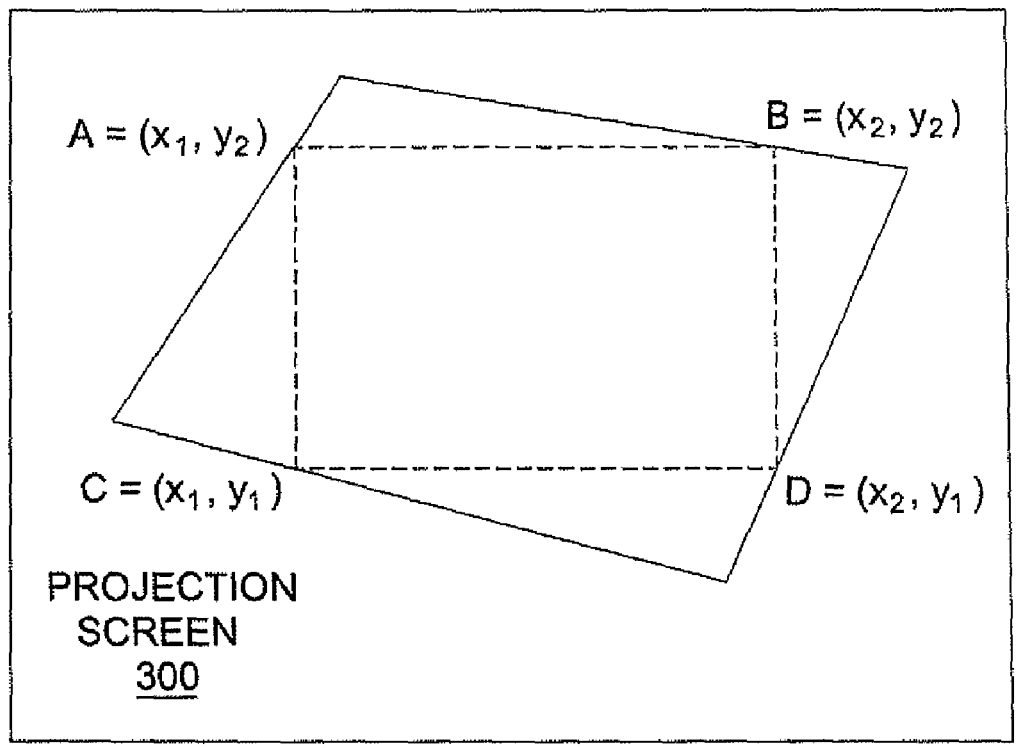
FIG. 6A illustrates an example of the boundaries of a keystone corrected image.
Figure 6B:
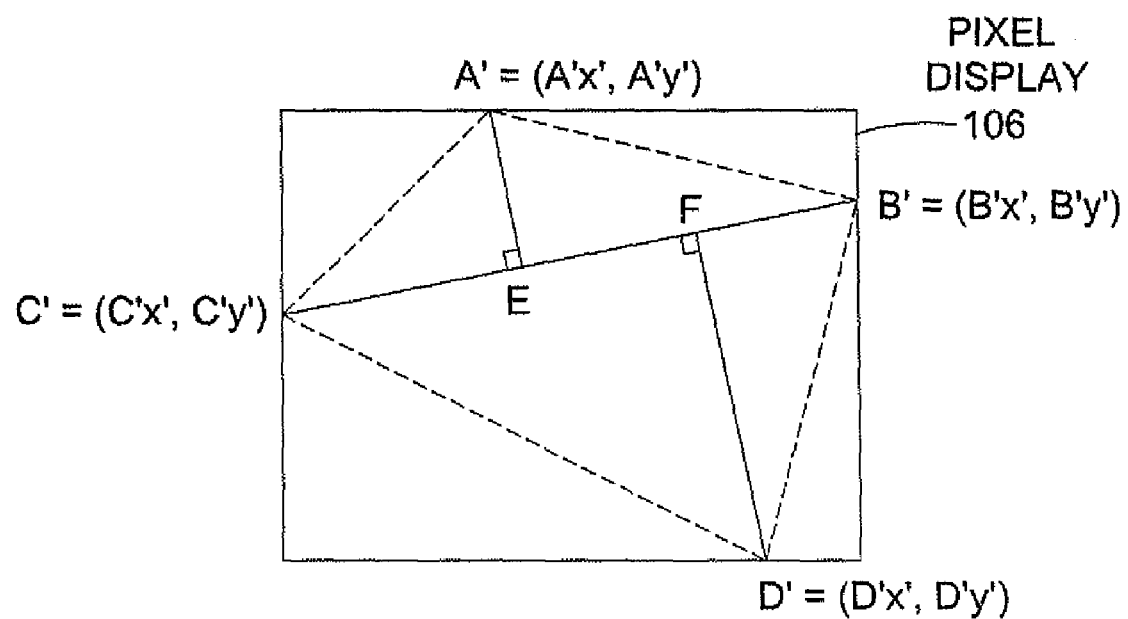
FIG. 6B illustrates an exemplary method for calculating a pixel area for the keystone correction of FIG. 6A.

Control unit 103 then represents the utilized pixel area of the pre-distorted graphic of FIG. 4B as an equation for finding the area of a quadrilateral. FIGS. 6A and 6B will now be used to explain the formulation of the equation for finding the area of an arbitrary quadrilateral. FIG. 6A shows a corrected image within projection area ABCD, and FIG. 6B shows a corresponding pixel area A'B'C'D' of a pre-distorted graphic. The area of quadrilateral A'B'C'D' in FIG. 6I can be expressed as $$\frac{B'C' \times (A'E' + D'F')}{2}.$$

In addition, distance B'C' is given by $$\sqrt{(Cy' - By')^2 + (Cx' - Bx')^2},$$

where C' x' and C' y' represent the pixel area coordinates for point C', and Bx' and By' represent the pixel area coordinates for point B'. Given that the distance A'E' is equal to the distance of point A' to segment B'C', it follows that distance $$A'E' = \frac{(C'y' - B'y')(A'x' - B'x') + (C'x' - B'x')(A'y' - B'y')}{\sqrt{(C'y' - B'y')^2 + (C'x' - B'x')^2}}.$$

Similarly, distance D'F' can be expressed as $$D'F' = \frac{(C'y' - B'y')(D'x' - B'x') + (C'x' - B'x')(D'y' - B'y')}{\sqrt{(C'y' - B'y')^2 + (C'x' - B'x')^2}}.$$

Substituting these distances for B'C', A'E' and D'F' into the equation for the area of a quadrilateral expressed above, and simplifying yields:

$$\text{Area of } A'B'C'D' = \frac{(C'y' - B'y')(A'x' - B'x') + (C'x' - B'x')(A'y' - B'y') +}{2} \quad \text{(Eq. 1)}$$
$$\frac{(C'y' - B'y')(D'x' - B'x') + (C'x' - B'x')(D'y' - B'y')}{2}.$$

This equation will be referred to as Equation 1 throughout this disclosure.

Referring again to FIG. 5, in step 13, control unit 103 applies homography matrix H to the coordinates of ABCD as expressed in terms of either x1 or x2, as discussed above. The application of homography matrix H provides that the homogeneous coordinate of A is expressed as: (h11·x1+h12·y2+h13, h21·x1+h22·y2+h23, h31·x1+h32·y2+h33), and the non-homogeneous coordinate of A' is expressed as: ((h11·x1+h12·y2+h13)÷(h31·x1+h32·y2+h33), (h21·x1+h22·y2+h23)÷(h31·x1+h32·y2+h33)). The coordinates of B', C' and D' may be formulated in terms of x1, x2, y1 and y2 in the same way, and as discussed above, these variables can further be expressed in terms of either x1 or x2. These mapped coordinates are then substituted into Equation 1 which defines an area of quadrilateral A'B'C'D' shown in FIG. 4B.

To increase the pixel area utilized in displaying the pre-distorted graphic control unit 103 maximizes Equation 1 in terms of either x1 or x2. Equation 1 is maximized for two possible conditions. The first condition is where the derivative of Equation 1 is equal to 0. The second condition is where one of A, B, C or D coincide with a corner of the projection area for the uncorrected image, indicated by the solid line boundary in FIG. 4A.

For the first condition, setting the derivative of Equation 1 to 0 allows control unit 103 to solve for either x1 or x2, depending on whether the coordinates of quadrilateral A'B'C'D' are expressed in terms of either x1 or x2 after applying homography matrix H.

Assuming that rectangle ABCD is first expressed in terms of x1, control unit 103 can then solve for x1 when the derivative of Equation 1 is written in terms of x1 and is set equal to 0. After solving for x1, control unit 103 then substitutes the value of x1 into Equation 1, as written in terms of x1, and calculates a pixel area utilized in displaying a corresponding pre-distorted graphic. This calculated area is then stored in memory 102 if the coordinates ABCD provide a valid rectangle. If the coordinates for ABCD do not provide a valid rectangle, then the process described above is repeated for the formulation of rectangle ABCD as expressed in terms of x2.

For the second condition, where one of A, B, C or D coincide with a corner of the uncorrected image, the coordinates are known for that point because the corners of the uncorrected image have been assigned fixed values in the aligned coordinate system. From this known coordinate, each of the other coordinates may then be calculated from the equations for the lines coincident with the edges of the uncorrected image due to the lemma mentioned above in reference to FIG. 3A, and the rectangular shape of ABCD. The calculated coordinates for ABCD are then mapped to the pixel area coordinate system using homography matrix H. These values are used in Equation 1 to compute a pixel area utilized in displaying a pre-distorted graphic. The calculated pixel area is then stored in memory 102, and the process described above can be repeated for each of the remaining three coordinates of ABCD. Alternatively, control unit 103 may only perform this calculation for corners of the uncorrected image that form at least a perpendicular angle. This ordinarily ensures that a given coordinate set based on a coincident corner of the uncorrected image forms a valid rectangle.

The calculated values for pixel area utilized by displaying the pre-distorted graphic are then compared to each other, and control unit 103 selects the set of coordinates for quadrilateral A'B'C'D' that correspond to the largest pixel area. These coordinates are then used to derive a second homography matrix, transformation T, that maps the four corners (0,n), (m,n), (0,0) and (n,0) of pixel display 106 to the four corners of quadrilateral A'B'C'D'.

As shown in FIG. 5, in step 14, control unit 103 then applies transformation T to the uncorrected graphic to obtain the pre-distorted graphic by scaling the image data for the uncorrected graphic using transformation T. Although the pre-distorted graphic generally utilizes less pixel area than the uncorrected graphic, the loss of pixel area due to keystone correction is ordinarily ameliorated through the derivation of transformation T.

In step 15, control unit 103 controls display unit 105 to display the pre-distorted graphic. The pre-distorted graphic is then projected via projection lens system 111 onto projection screen 300 to form a corrected image. The outline of such a corrected image is illustrated by rectangle ABCD in FIG. 4A.

After projecting the corrected image, control unit 103 may use transformation T to pre-distort other graphics corresponding to image data received from host 400.

Figure 7A:
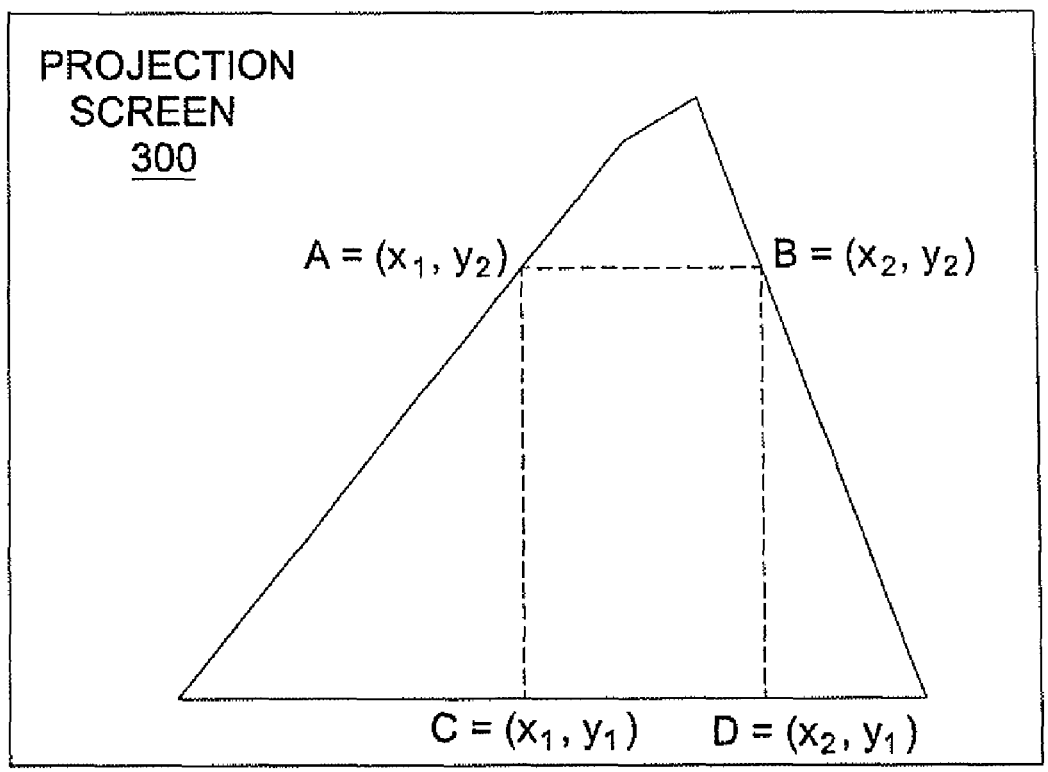
FIG. 7A illustrates an example of the boundaries of a keystone corrected image when keystone correction is performed by increasing both pixel utilization and an area aligned with the projection screen.

FIG. 7A shows an example of the uncorrected image of FIGS. 3A and 4A, in addition to a different corrected image projected by projector 100 onto projection screen 300. The outline of the uncorrected image is indicated by the solid line forming a non-rectangular quadrilateral and represents the utilization of the full available pixel area of pixel display 106.

The outline of the corrected image is indicated by a dashed line forming rectangle ABCD, which has corners represented by variable coordinates in a coordinate system aligned with projection screen 300. In this case, rectangle ABCD is formed as a result of increasing both the pixel area used in displaying the pre-distorted graphic and the projection area of ABCD on projection screen 300. This allows for the consideration of both projection area and resolution of the corrected image projected onto projection screen 300.

Figure 7B:
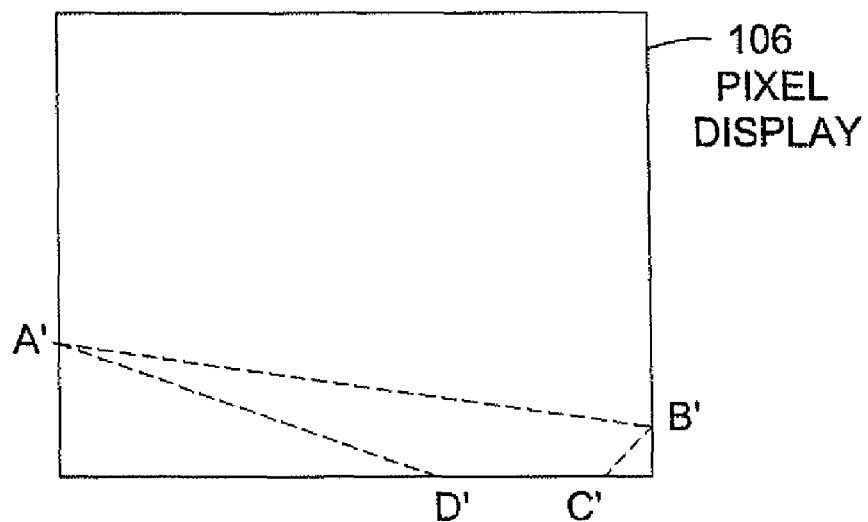
FIG. 7B illustrates an example of pixel utilization corresponding to the keystone correction of FIG. 7A.

FIG. 7B shows the outline of a pre-distorted graphic, quadrilateral A'B'C'D', displayed by pixel display 106 that corresponds to rectangle ABCD in FIG. 7A. Although, quadrilateral A'B'C'D' does not utilize the full available pixel area of pixel display 106, the pixel area of A'B'C'D' has been increased in relation to the pixel area utilized in FIG. 3B.

Figure 8:
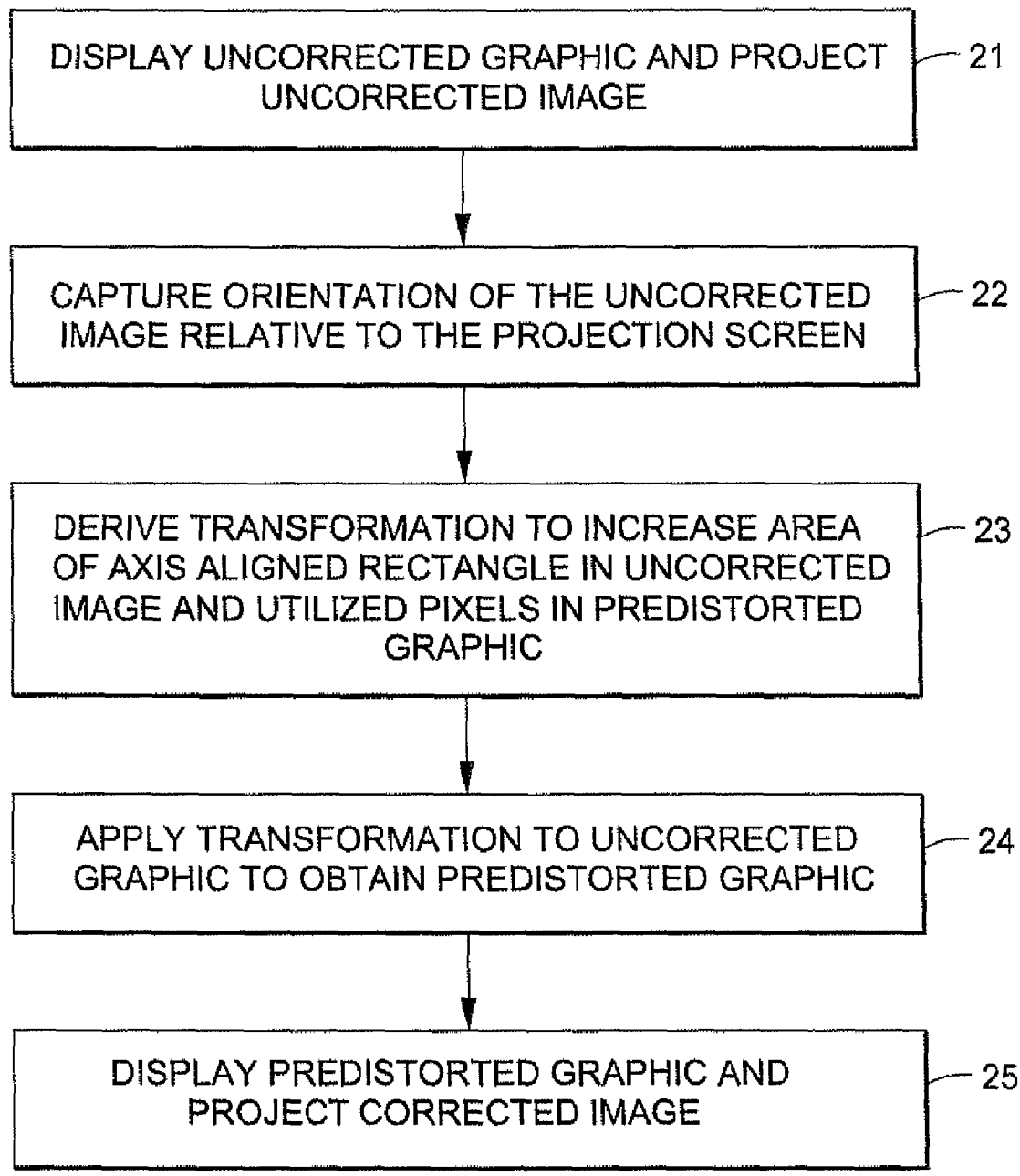
FIG. 8 is a flowchart illustrating an exemplary keystone correction process for the first embodiment corresponding to FIGS. 7A and 7B.

FIG. 8 is an exemplary keystone correction process in projector 100 corresponding to the keystone correction of FIGS. 7A and 7B. Briefly, according to the process steps shown in FIG. 8, projector 100 displays an uncorrected graphic at display unit 105 and projects the uncorrected graphic through projection lens system 111 to form an uncorrected image on projection screen 300. Orientation capture unit 115 then captures the orientation of the uncorrected image relative to projection screen 300. Control unit 103 derives a transformation to transform the uncorrected graphic into a pre-distorted graphic so that a corrected image counterpart is more aligned with projection screen 300. The transformation is also derived so as to increase both the area of ABCD in comparison to FIG. 4A, and the area of A'B'C'D' in comparison to FIG. 3B. Control unit 103 then applies the derived transformation to the uncorrected graphic and controls display unit 105 to display the pre-distorted graphic. The pre-distorted graphic is then projected by projector 100 to form a corrected image within ABCD on projection screen 300.

In more detail, in step 21, control unit 103 causes display unit 105 to display an uncorrected graphic in accordance with image data received from host 400. The uncorrected graphic is then projected via projection lens system 111 onto projection screen 300 to form an uncorrected image.

In step 22, control unit 103 sends an orientation capture command to orientation capture unit 115. Orientation capture unit 115 then captures an orientation of the uncorrected image relative to projection screen 300. This may be accomplished by capturing an image including both the uncorrected image and projection screen 300. The orientation is then stored in memory 102.

In step 23, control unit 103 derives a transformation to distort the uncorrected graphic into a pre-distorted graphic. Control unit 103 accesses the orientation of the uncorrected image relative to the projection screen 300 from memory 102 and generates a coordinate system aligned with the edges of projection screen 300. The corners of rectangle ABCD, as shown in FIG. 7A, are then assigned variables within the aligned coordinate system, such as: A=(x1, y2); B=(x2, y2); C=(x1, y1); and D=(x2, y1). As described in reference to step 13 of FIG. 5, the coordinates of ABCD may then be expressed in terms of either x1 or x2.

In addition, the corners of the uncorrected image may be assigned fixed coordinates and then used to generate a homography matrix H for mapping coordinates in the aligned coordinate system to a coordinate system representing the pixel area of pixel display 106. Control unit 103 then applies homography matrix H to the coordinates of ABCD as expressed in terms of either x1 or x2.

The derivation of a transformation is then performed by maximizing a product of two area fractions. The first area fraction represents a projection area of a corrected image counterpart to the pre-distorted graphic, represented by rectangle ABCD in FIG. 7A. The area of ABCD may be expressed as $(x2-x1) \cdot (y2-y1)$ and this may be further expressed in terms of x1 or x2 given that the coordinates of ABCD may be expressed in terms of x1 or x2, as discussed above. In this example process, the area of ABCD is also divided by the total projection area of the uncorrected image to form the first area fraction. The area of the uncorrected image may be calculated using Equation 1 for the fixed corners of the uncorrected image. The first area fraction may then be expressed in terms of x1 or x2 given that the coordinates of ABCD may be expressed in terms of x1 or x2. In alternative embodiments, the area of ABCD may instead be given an independently weighted value to form the first area fraction based on a particular application, rather than by dividing the area of ABCD by the projection area of the uncorrected image.

The second area fraction represents a pixel area of pixel display 106 utilized in displaying the pre-distorted graphic, which is corresponds to quadrilateral A'B'C'D' in FIG. 7B. The area of A'B'C'D' may be formulated by using Equation 1, which may be further expressed in terms of x1 or x2 after applying homography matrix H, as discussed above in reference to FIG. 5. In this example process, the area of A'B'C'D' is divided by the value of m·n, where m and n refer to the pixel width and pixel height of pixel display 106, to form the second area fraction. As with the first area fraction, in alternative embodiments, the area of A'B'C'D' may instead be given an independently weighted value to form the first area fraction based on a particular application.

Control unit 103 may then solve for x1 or x2 when the product of the first area fraction and the second area fraction is maximized by setting the derivative of the product to 0. As with the derivation described in step 13 of FIG. 5, control unit 103 may then calculate a maximum value for the product of the area fractions for both x1 or x2. In addition, the maximum value may also be calculated for coordinates of ABCD that are coincident with a corner of the uncorrected image.

Control unit 103 then selects the set of coordinates for ABCD that provide the largest value for the product of the area fractions. Control unit 103 then maps these coordinates using homography matrix H, to find the coordinates for quadrilateral A'B'C'D'. These mapped coordinates are then used to derive a second homography matrix, transformation T, that maps the four corners (0,n), (m,n), (0,0) and (n,0) of pixel display 106 to the four corners of quadrilateral A'B'C'D'.

As shown in FIG. 8, in step 24, control unit 103 then applies transformation T to the uncorrected graphic to obtain the pre-distorted graphic by scaling the image data for the uncorrected graphic using transformation T.

In step 25, control unit 103 controls display unit 105 to display the pre-distorted graphic. The pre-distorted graphic is then projected via projection lens system 111 onto projection screen 300 to form a corrected image. The outline of such a corrected image is illustrated by rectangle ABCD in FIG. 7A.

Second Embodiment

Figure 9:
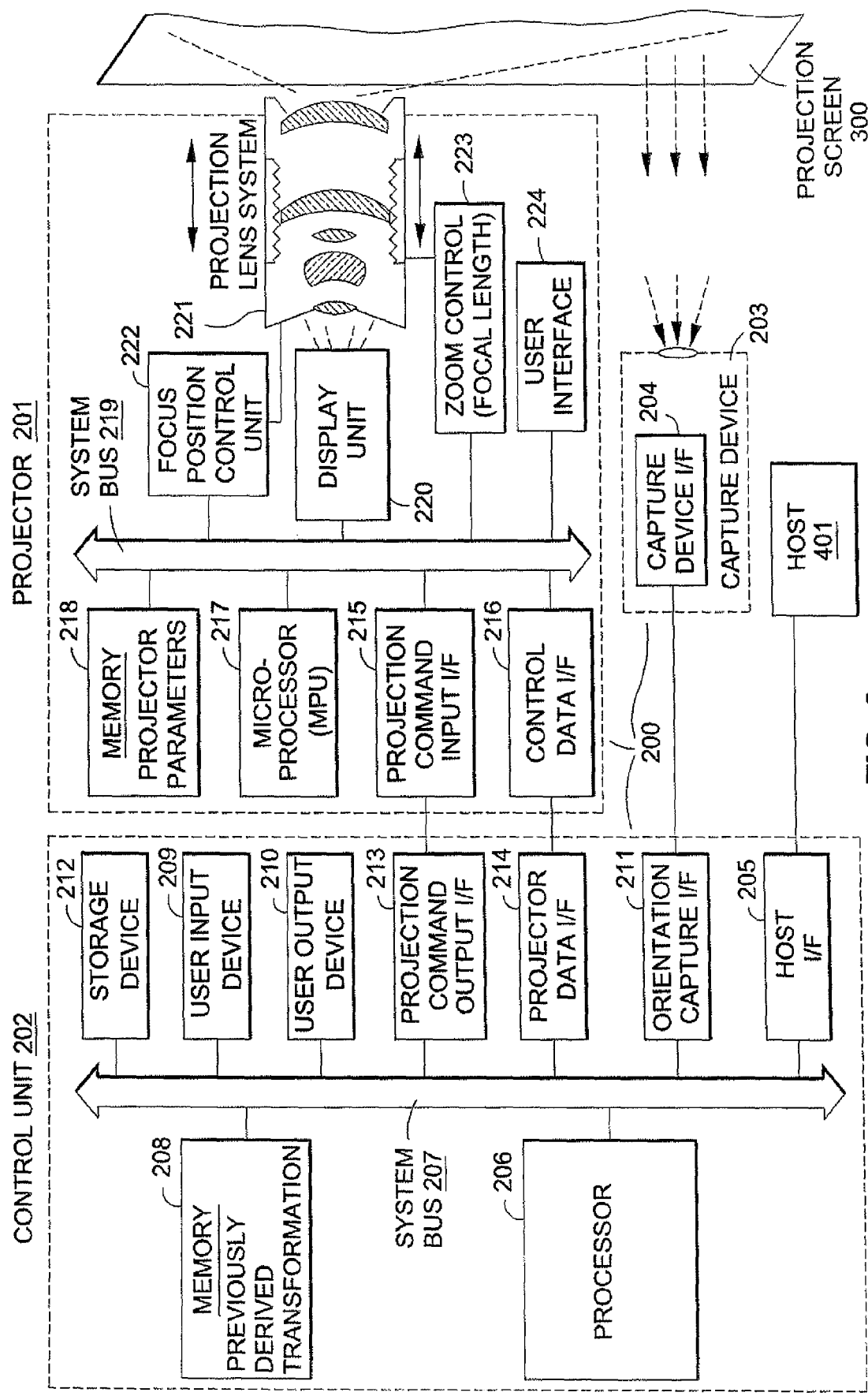
FIG. 9 illustrates a second example embodiment of an image projection system for projecting an image onto a projection screen.

FIG. 9 illustrates a second embodiment, and shows an image projection system 200 that includes projector 201, control unit 202 and capture device 203. As with projector 100 of FIG. 1, projector 201 may include an LCD projector, DLP projector, LCOS projector, or LED projector. However, one difference between the first and second embodiments is that, unlike projector 100 of the first embodiment, projector 201 does not have an orientation capture unit or control unit. Instead, control unit 202 and capture device 203 are components separate from projector 201.

Control unit 202 is constructed to receive image data from host 401 and to control projector 201 to project an image onto projection screen 300 in accordance with the image data received from host 401. Control unit 202 is also constructed to control capture device 203 to capture an orientation of the projected image relative to projection screen 300. Control unit 202 may include, for example, a desktop PC or a laptop PC.

Control unit 202 includes host interface 205 for communicating with host 401. Host 401 may include a device capable of transmitting image data to control unit 202, such as, a DVD player, camcorder, or digital camera. In an alternative embodiment, host 401 may also include an application executed at control unit 202.

As shown in FIG. 9, host interface 205 is coupled to processor 206 via system bus 207. Processor 206 is also coupled to memory 208 which is constructed for storing data, such as a previously derived transformation in accordance with this disclosure.

Processor 206 is further coupled to user input device 209 and user output device 210 via system bus 207. User input device 209 can include hardware such as, for example, a keyboard or a mouse, which allow a user of control unit 202 to input commands. User output device 210 can include hardware such as a display monitor or a screen, which may display information pertaining to the operation of image projection system 200.

A storage device 212 having computer-readable media is also coupled to processor 206 via system bus 207. Storage device 212 may include, for example, a CD-ROM drive or a hard disk drive. In one exemplary implementation, storage device 212 is used by processor 206 to read data and program instructions that are loaded into memory 208 to execute a process for controlling image projection system 200.

As shown in FIG. 9, control unit 202 includes orientation capture interface 211 for communicating with capture device 203. Orientation capture interface 211 is coupled to processor 206 via system bus 207.

Control unit 202 includes two interfaces for communicating with projector 201. Both interfaces are coupled to processor 206 via system bus 207. The first interface, projection command output interface 213, is constructed for communicating projection commands to projector 201. The second interface, projector data interface 214, is used for all other communications between control unit 202 and projector 201, such as receiving projector parameters from projector 201

Projection command output interface 213 and projector data interface 214 communicate respectively with projection command input interface 215 and control data interface 216 of projector 201. Projection command input interface 215 is constructed to receive projection commands from control unit 202 and is coupled to microprocessor 217 via system bus 219. Similarly, control data interface 216 is constructed to communicate data, such as projector parameters, with control unit 202 and is also coupled to microprocessor 217 via system bus 219.

Microprocessor 217 is also coupled to memory 218 which is constructed for storing data, such as projector parameters in accordance with this embodiment.

Projector 201 also includes display unit 220 for emitting light in accordance with projection commands received from control unit 202 or from microprocessor 217. The construction of display unit 220 is similar to the configuration of display unit 105 shown in FIG. 2A. Display unit 220 may include a single pixel display or multiple pixel displays that can be represented by pixel display 106, as shown in FIG. 2. Display unit 220 is coupled to microprocessor 217, which controls display unit 220 via system bus 219, to display graphics in accordance with projection commands received from control unit 202.

As shown in FIG. 9, projection lens system 221 is constructed with multiple lenses to focus light emitted by display unit 220. Projection lens system 221 is arranged mechanically to allow for adjustable focus position and for adjustable zoom (focal length). The lenses in projection lens system 221 may include a combination of fixed lenses and adjustable lenses that reposition axially. In operation, the magnification of a projected image can be changed by repositioning a zoom lens in projection lens system 221. As the zoom lens moves, the focal length of projection lens system 221 changes, and a focus lens may be repositioned to keep the projected image sufficiently in focus. Additionally, a projected image can be focused by adjusting the focus position of a focus lens or multiple focus lenses.

Projection lens system 221 is connected to both focus position control unit 222 for adjusting the focus position of projection lens system 221, and zoom control unit 223 for adjusting the focal length of projection lens system 221. Focus position control unit 222 and zoom control unit 223 may include servo motors or a system of gears and cams to drive various lenses within projection lens system 221 to new positions. Focus position control unit 222 and zoom control unit 223 are coupled to microprocessor 217 via system bus 219, and are constructed to receive commands from microprocessor 217 to reposition lenses in projection lens system 221.

Microprocessor 217 is also coupled to user interface 224 via system bus 219. User interface 224 is constructed for receiving user input, such as zoom and focus commands. User interface 224 may also include a display for displaying menus and information pertaining to the operation of projector 201.

As shown in FIG. 9, capture device 203 includes a capture device interface 204 for communicating with control unit 202 via orientation capture interface 211. Capture device 203 is constructed for capturing images from projection screen 300 and is controlled by control unit 202. Capture device 203 may include a camera with auto-focus set on the sharp boundaries of projection screen 300 or a pinhole camera that is generally in-focus for most distances from capture device 203. Capture device 300 may also include, for example, a web camera or a video camera.

In accordance with an example embodiment of the present disclosure, control unit 202 requests projector parameters from projector 201 via projector data interface 214. The projector parameters include pixel information that pertain to display unit 220 of projector 201. The pixel information may include, for example, a pixel width m and pixel height n for a pixel display of display unit 220.

Projector 201 receives the request for projector parameters at data control interface 216, and microprocessor 217 retrieves projector parameters from memory 218. Processor 217 then controls control data interface 216 to send the projector parameters to control unit 202. After receiving the projector parameters at projector data interface 214, the projector parameters are stored in memory 208.

Control unit 202 then receives image data from host 401 at host interface 205. The received image data is then processed by processor 206 to generate a projection command in accordance with the received image data and projector parameters. Processor 206 controls projection command output interface 213 to send the projection command to projector 201.

Projector 201 receives the projection command at projection command input interface 215, and microprocessor 217 controls display unit 220 to display a graphic in accordance with the projection command. The light emitted from display unit 220 then passes through projection lens system 221 to project an image onto projection screen 300.

After transmitting the projection command to projector 201, processor 206 sends an orientation capture command to capture device 203, via orientation capture interface 211. The orientation capture command controls capture device 204 to capture the orientation of the projected image relative to projection screen 300. The orientation capture command may also specify a focus setting for capture device 203, such as the smallest aperture size of capture device 203.

After capturing the orientation of the projected image, capture device 203 communicates the orientation to control unit 202 via capture device interface 204. Control unit 202 receives the orientation at orientation capture interface 211, and stores the captured orientation in memory 208.

Processor 206 then derives a transformation for pre-distorting the graphic displayed by display unit 220, so as to better align the projected image with projection screen 300. In addition, processor 206 uses the pixel information stored in memory 208 in deriving the transformation.

After deriving the transformation, processor 206 applies the transformation to the displayed graphic by generating a second projection command. The second projection command is sent to projector 201 via projection command output interface 213. Projector 201 receives the second projection command at projection input interface 215, and microprocessor 217 controls display unit 220 to display the pre-distorted graphic in accordance with the second projection command. The light emitted from display unit 220 then passes through projection lens system 221 to project a keystone corrected image onto projection screen 300.

Figure 10:
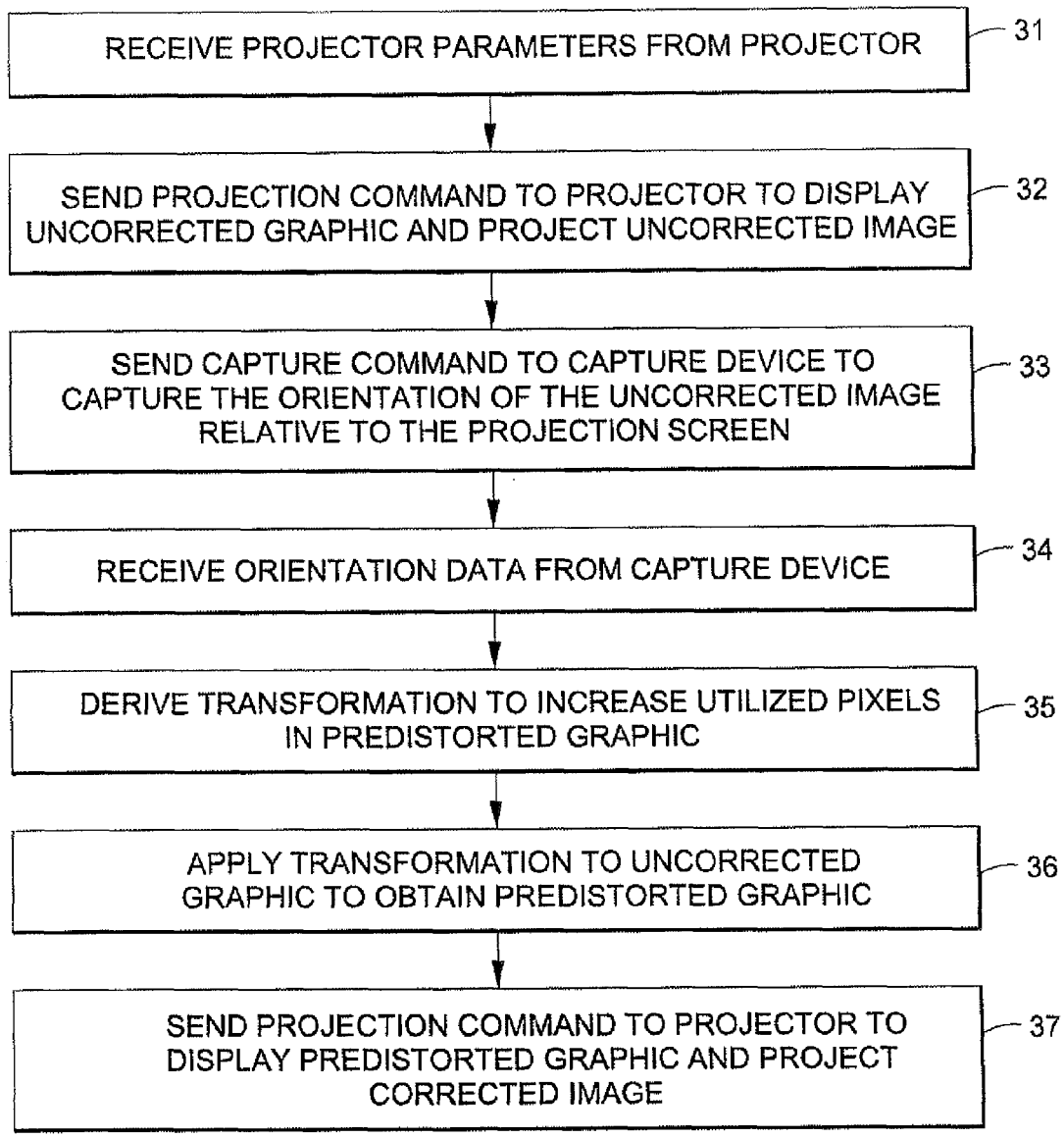
FIG. 10 is a flowchart illustrating an exemplary keystone correction process for the second embodiment corresponding to FIGS. 4A and 4B.

FIG. 10 is a flowchart illustrating an example keystone correction process for image projection system 200 that corresponds to FIGS. 4A and 4B. Briefly, according to the process steps shown in FIG. 10, control unit 202 receives projector parameters from projector 201. Control unit 202 then controls projector 201 to display an uncorrected graphic at display unit 220 by transmitting a projection command. The uncorrected graphic is then projected by projection lens system 221 onto projection screen 300. Control unit 202 then controls capture device 203 to capture the orientation of the uncorrected image relative to projection screen 300. After receiving the captured orientation from capture device 203, control unit 202 derives a transformation to transform the uncorrected graphic into a pre-distorted graphic so that a corrected image counterpart is more aligned with projection screen 300, while increasing a pixel area utilized in displaying the pre-distorted graphic in comparison to the pixel area of A'B'C'D' shown in FIG. 3B. Control unit 202 then applies the derived transformation to the uncorrected graphic by generating a projection command to control display unit 220 to display the pre-distorted graphic. The pre-distorted graphic is then projected by projector 201 to form a corrected image on projection screen 300.

In more detail, in step 31 control unit 202 requests projector parameters from projector 201 via projector data interface 214. The projector parameters include pixel information that pertain to display unit 220 of projector 201. The pixel information may include, for example, a pixel width m and pixel height n for a pixel display of display unit 220.

Projector 201 receives the request for projector parameters at data control interface 216, and microprocessor 217 retrieves projector parameters from memory 218. Processor 217 then controls control data interface 216 to send the projector parameters to control unit 202. After receiving the projector parameters at projector data interface 214, the projector parameters are stored in memory 208.

In step 32, control unit 202 receives image data from host 401 via host interface 205. Processor 206 generates a projection command based on the received image data and sends the projection command to projector 201 via projection command output interface 213. The projection command is received by projector 201 at projection command input interface 215, and microprocessor 217 controls display unit 220 to display an uncorrected graphic in accordance with the projection command. The uncorrected graphic is projected onto projection screen 300 by projection lens system 221.

In step 33, processor 206 sends an orientation capture command to capture device 203 via orientation capture interface 211. The orientation capture command is received by capture device 203 at capture device interface 204, and controls capture device 203 to capture an orientation of the projected uncorrected image relative to projection screen 300.

In step 34, capture device 203 sends the orientation to control unit 202 via capture device interface 204. Control unit 202 receives the orientation at orientation capture interface 211, and stores the orientation in memory 208.

In step 35, processor 206 derives a transformation to pre-distort the uncorrected graphic so as to align the orientation of the uncorrected image with projection screen 300. Processor 206 also derives the transformation such that the pre-distorted graphic utilizes a maximized pixel area in display unit 220.

In order to derive the transformation, processor 206 accesses the orientation of the uncorrected image from memory 208 and generates a coordinate system aligned with the edges of projection screen 300. The corners of a rectangle corresponding to a corrected image, as shown in FIG. 4A as ABCD, are then assigned variables within the aligned coordinate system, such as: $A=(x1, y2)$; $B=(x2, y2)$; $C=(x1, y1)$; and $D=(x2, y1)$. The coordinates of ABCD may then be expressed in terms of either $x1$ or $x2$.

In addition, the corners of the uncorrected image may be assigned fixed coordinates and then used to generate a homography matrix H for mapping coordinates in the aligned coordinate system to a coordinate system representing the pixel area of a pixel display in display unit 220. In order to generate homography matrix H, processor 206 accesses the pixel information stored in memory 208 to define the four corners of the pixel display of display unit 220. Processor 206 then applies homography matrix H to the coordinates of ABCD as expressed in terms of either x1 or x2 to obtain coordinates of a pixel area A'B'C'D' expressed in terms of either x1 or x2.

The coordinates of A'B'C'D' are then substituted into Equation 1, and processor 206 selects a set of coordinates for A'B'C'D' that correspond to a maximum value for Equation 1, as described in reference to step 13 of FIG. 5.

The selected coordinates of A'B'C'D' may then be used to generate a second homography matrix, transformation T, that maps the selected coordinates of A'B'C'D' to the four corners of the pixel display in display unit 220.

In step 36, processor 206 applies the transformation T so as to generate a projection command that will transform the uncorrected graphic displayed at display unit 220 into a pre-distorted graphic.

In step 37, the projection command is sent to projector 201 via projection command output interface 213 and is received by projector 201 at projection command input interface 215. Microprocessor 217 then controls display unit 220 to display the pre-distorted graphic. The pre-distorted graphic is then projected by projection lens system 221 to form a keystone corrected image on projection screen 300.

Figure 11:
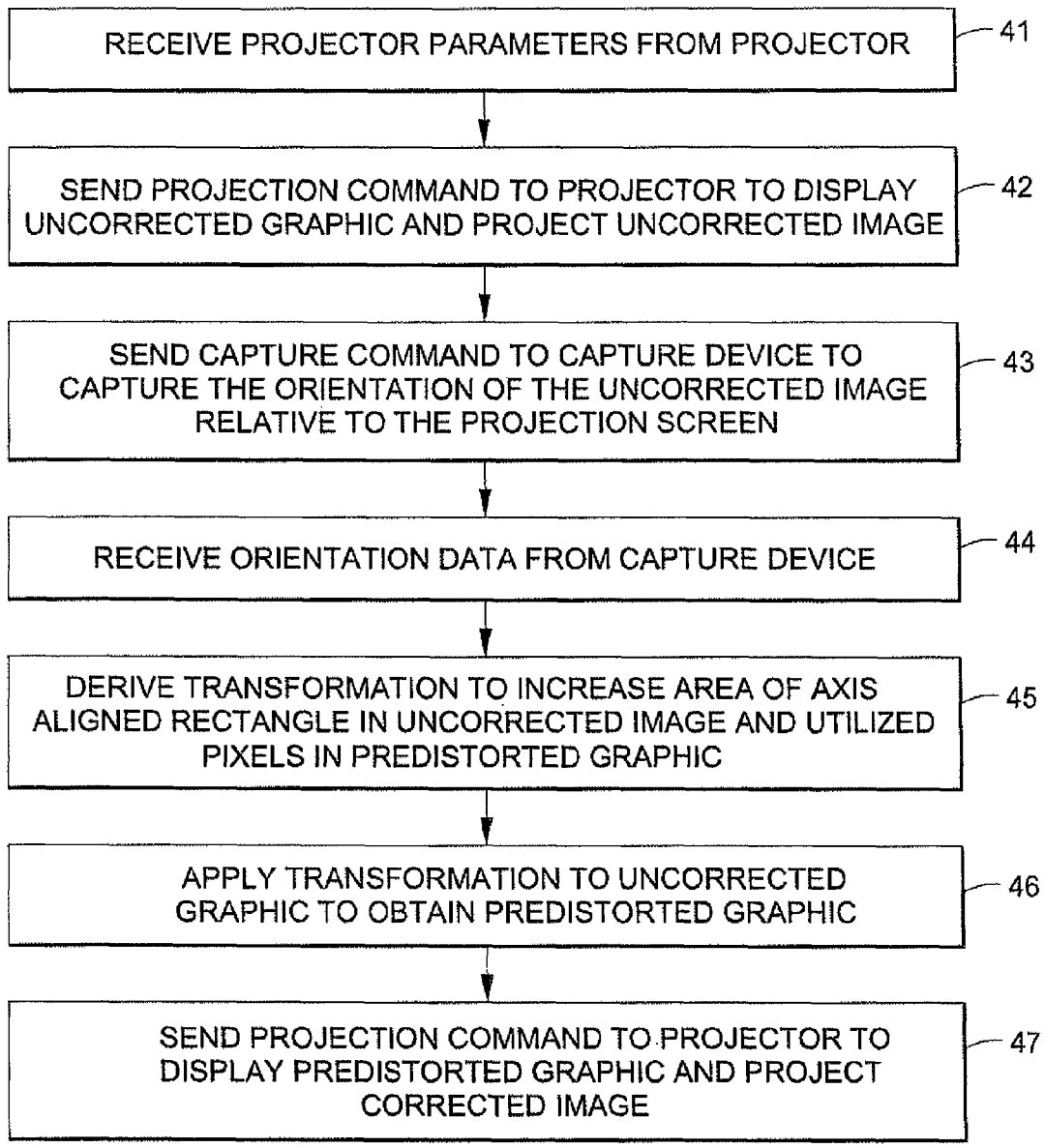
FIG. 11 is a flowchart illustrating an exemplary keystone correction process for the second embodiment corresponding to FIGS. 7A and 7B.

FIG. 11 is a flowchart illustrating an example keystone correction process for image projection system 200 corresponding to FIGS. 7A and 7B. Briefly, according to the process steps shown in FIG. 11, control unit 202 receives projector parameters from projector 201. Control unit 202 then controls projector 201 to display an uncorrected graphic at display unit 220 by transmitting a projection command. The uncorrected graphic is then projected by projection lens system 221 onto projection screen 300. Control unit 202 then controls capture device 203 to capture the orientation of the uncorrected image relative to projection screen 300. After receiving the captured orientation from capture device 203, control unit 202 derives a transformation to transform the uncorrected graphic into a pre-distorted graphic so that a corrected image counterpart is more aligned with projection screen 300. The transformation is also applied so as to increase the pixel area utilized in displaying the pre-distorted graphic in comparison to the pixel area of A'B'C'D' shown in FIG. 3B, and to also increase the projected area of a corrected image counterpart in comparison to the area of ABCD shown in FIG. 4A. Control unit 202 then applies the derived transformation to the uncorrected graphic by generating a projection command to control display unit 220 to display the pre-distorted graphic. The pre-distorted graphic is then projected by projector 201 to form a corrected image on projection screen 300.

In more detail, in step 41, control unit 202 requests projector parameters from projector 201 via projector data interface 214. The projector parameters include pixel information that pertain to display unit 220 of projector 201 and allow processor 206 to derive a transformation.

Projector 201 receives the request for projector parameters at data control interface 216, and microprocessor 217 retrieves projector parameters from memory 218. Processor 217 then controls control data interface 216 to send the projector parameters to control unit 202. After receiving the projector parameters at projector data interface 214, the projector parameters with the pixel information are stored in memory 208.

In step 42, control unit 202 receives image data from host 401 via host interface 205. Processor 206 generates a projection command based on the received image data and sends the projection command to projector 201 via projection command output interface 213. The projection command is received by projector 201 at projection command input interface 215, and microprocessor 217 controls display unit 220 to display an uncorrected graphic in accordance with the projection command. The uncorrected graphic is then projected onto projection screen 300 by projection lens system 221.

In step 43, processor 206 sends an orientation capture command to capture device 203 via orientation capture interface 211. The orientation capture command is received by capture device 203 at capture device interface 204, and controls capture device 203 to capture an orientation of the projected uncorrected image relative to projection screen 300.

In step 44, capture device 203 sends the orientation to control unit 202 via capture device interface 204. Control unit 202 receives the orientation at orientation capture interface 211, and stores the orientation in memory 208.

In step 45, processor 206 derives a transformation to pre-distort the uncorrected graphic so as to align the orientation of the uncorrected image with projection screen 300. Processor 206 also derives the transformation so as to maximize a product of a first area fraction representing a projection area aligned with projection screen 300, and a second area fraction representing pixels utilized in displaying the pre-distorted graphic.

In order to derive the transformation, processor 206 accesses the orientation of the uncorrected image from memory 208 and generates a coordinate system aligned with the edges of projection screen 300. The corners of a rectangle corresponding to a corrected image, as shown in FIG. 7A as ABCD, are then assigned variables within the aligned coordinate system, such as: A=(x1, y2); B=(x2, y2); C=(x1, y1); and D=(x2, y1). The coordinates of ABCD may then be expressed in terms of either x1 or x2.

In addition, the corners of the uncorrected image may be assigned fixed coordinates and then used to generate a homography matrix to map coordinates in the aligned coordinate system to a coordinate system representing the pixel area of a pixel display in display unit 220.

The first area factor representing an aligned projection area may be formulated by dividing the area of ABCD by the area of the uncorrected image, which is represented by the solid boundary in FIG. 7A. In addition, the area of ABCD is expressed as (x2−x1)·(y2−y1) and the area of the uncorrected image is calculated using Equation 1 for the fixed corners of the uncorrected image. This first area factor may then be expressed in terms of x1 or x2, given that the coordinates of ABCD may be expressed in terms of x1 or x2 and the area of the uncorrected image is a fixed value. In alternative embodiments, the area of ABCD may instead be given an independently weighted value to form the first area fraction based on a particular application, rather than by dividing the area of ABCD by the projection area of the uncorrected image.

The second area fraction representing pixels utilized in displaying the pre-distorted graphic may be formulated by dividing the area of A'B'C'D' of FIG. 7B by the product of the pixel width and pixel height stored in memory 208 as part of the pixel information. The area of A'B'C'D' can be expressed using Equation 1, and as discussed above in reference to FIG. 8, Equation 1 may also be expressed in terms of x1 or x2 after applying homography matrix H. As with the first area fraction, in alternative embodiments, the area of A'B'C'D' may instead be given an independently weighted value to form the first area fraction based on a particular application.

Processor 206 then selects a set of coordinates for A'B'C'D' that maximize the product of the first and second area fractions. The selected coordinates for A'B'C'D' are then used to determine a transformation T, that maps the corners of the pixel area of a pixel display in display unit 220 to the corners of A'B'C'D'. Transformation T is then stored in memory 208.

In step 46, processor 206 applies the transformation T so as to generate a projection command that will transform the uncorrected graphic displayed at display unit 220 into the pre-distorted graphic.

In step 47, the projection command is sent to projector 201 via projection command output interface 213 and is received by projector 201 at projection command input interface 215. Microprocessor 217 then controls display unit 220 to display the pre-distorted graphic. The pre-distorted graphic is then projected by projection lens system 221 to form a keystone corrected image on projection screen 300.

As indicated in FIG. 9, memory 208 stores previously derived transformations so that processor 206 may apply a given transformation to other graphics corresponding to image data received from host 401.

By virtue of the above-described arrangements, keystone correction may be performed while ordinarily ameliorating the loss of resolution that often accompanies keystone correction.

Although the invention has been described with particular illustrative embodiments, the invention is not limited to the above-described embodiments and various changes and modification may be made by those of ordinary skill in the art without departing from the spirit and scope of this disclosure.

What is claimed is:

1. An image projection system comprising:
    a projector comprising a display unit including a plurality of pixels to display a graphic for projection to a projection screen to form a projected image;
    a capture device constructed to capture an orientation of the projected image from the projection screen; and
    a control unit constructed to control the projector to project an uncorrected graphic from the display unit, to control the capture device to capture the orientation of the uncorrected image relative to the projection screen, to derive a transformation which is applied by the control unit so as to transform the uncorrected graphic into a pre-distorted graphic, and to control the projector to project the pre-distorted graphic from the display unit to form a corrected image,
    wherein the transformation is such that the corrected image counterpart to the pre-distorted graphic has an orientation more aligned with the projection screen than the orientation of the uncorrected image and such that the pre-distorted graphic utilizes more pixels in the display unit than a second pre-distorted graphic, wherein the second pre-distorted graphic is calculated by transforming the uncorrected graphic so that the second pre-distorted graphic forms a second corrected image with a maximum rectangular area inside the uncorrected image projected from the display unit onto the projection screen.

2. An image projection system according to claim 1, further comprising:
    a display unit interface for communicating between the display unit and the control unit;
    a capture device interface for communicating between the capture device and the control unit, wherein the capture device interface communicates the orientation of the uncorrected image relative to the projection screen from the capture device to the control unit;
    a first control unit interface for communicating between the control unit and the capture device, wherein the first control unit interface communicates an orientation capture command from the control unit to the capture device; and
    a second control unit interface for communicating between the control unit and the display unit, wherein the second control unit interface communicates the uncorrected graphic and the pre-distorted graphic from the control unit to the display unit.

3. An image projection system according to claim 2, wherein the capture device is a camera.

4. An image projection system according to claim 2, wherein deriving the transformation includes maximizing a number of pixels in the display unit utilized to display the pre-distorted graphic.

5. An image projection system comprising:
    a projector comprising a display unit including a plurality of pixels to display a graphic for projection to a projection screen to form a projected image;
    a capture device constructed to capture an orientation of the projected image from the projection screen;
    a control unit constructed to control the projector to project an uncorrected graphic from the display unit, to control the capture device to capture the orientation of the uncorrected image relative to the projection screen, to derive a transformation which is applied by the control unit so as to transform the uncorrected graphic into a pre-distorted graphic, and to control the projector to project the pre-distorted graphic from the display unit to form a corrected image,
    wherein the transformation is such that the corrected image counterpart to the pre-distorted graphic has an orientation more aligned with the projection screen than the orientation of the uncorrected image and such that the pre-distorted graphic utilizes more pixels in the display unit than a second pre-distorted graphic, wherein if formed, the second pre-distorted graphic would be formed by transforming the uncorrected graphic so that the second pre-distorted graphic forms a second corrected image with a maximum rectangular area inside the uncorrected image when projected from the display unit onto the projection screen, and
    wherein deriving the transformation includes maximizing a product of a first area fraction representing a projection area aligned with the projection screen, and a second area fraction representing pixels utilized in displaying the pre-distorted graphic.

6. An image projection system according to claim 2, further comprising a host computer interface for communicating between a host computer and the projector, wherein a host computer communicates a presentation to the projector, and the control unit applies the transformation to graphics corresponding to the presentation.

7. An image projection system according to claim 1, further comprising:
    a first projector interface for receiving projection commands from the control unit;
    a second projector interface for communicating between the projector and the control unit, wherein the second projector interface communicates projector parameters including pixel information from the projector to the control unit, and the control unit uses the pixel information obtained from the projector parameters in deriving the transformation;
    a capture device interface for communicating between the capture device and the control unit, wherein the capture device interface communicates the orientation of the uncorrected image relative to the projection screen from the capture device to the control unit;

a first control unit interface for communicating between the control unit and the projector, wherein the first control unit interface receives the projector parameters, via the second projector interface;

a second control unit interface for communicating between the control unit and the capture device, wherein the second control unit interface communicates an orientation capture command from the control unit to the capture device; and a third control unit interface for communicating between the control unit and the projector, wherein the third control unit interface communicates projection commands to the projector, via the first projector interface, to display the uncorrected graphic and the pre-distorted graphic, and to project the uncorrected image and the corrected image, respectively.

8. An image projection system according to claim 7, wherein the capture device is a camera.

9. An image projection system according to claim 7, wherein deriving the transformation includes maximizing a number of pixels in the display unit utilized to display the pre-distorted graphic.

10. An image projection system comprising:
a projector comprising a display unit including a plurality of pixels to display a graphic for projection to a projection screen to form a projected image;
a capture device constructed to capture an orientation of the projected image from the projection screen; and
a control unit constructed to control the projector to project an uncorrected graphic from the display unit, to control the capture device to capture the orientation of the uncorrected image relative to the projection screen, to derive a transformation which is applied by the control unit so as to transform the uncorrected graphic into a pre-distorted graphic, and to control the projector to project the pre-distorted graphic from the display unit to form a corrected image, wherein the transformation is such that the corrected image counterpart to the pre-distorted graphic has an orientation more aligned with the projection screen than the orientation of the uncorrected image and such that the pre-distorted graphic utilizes more pixels in the display unit than a second pre-distorted graphic, wherein if formed, the second pre-distorted graphic would be formed by transforming the uncorrected graphic so that the second pre-distorted graphic forms a second corrected image with a maximum rectangular area inside the uncorrected image when projected from the display unit onto the projection screen;
a first projector interface for receiving projection commands from the control unit;
a second projector interface for communicating between the projector and the control unit, wherein the second projector interface communicates projector parameters including pixel information from the projector to the control unit, and the control unit uses the pixel information obtained from the projector parameters in deriving the transformation;
a capture device interface for communicating between the capture device and the control unit, wherein the capture device interface communicates the orientation of the uncorrected image relative to the projection screen from the capture device to the control unit;
a first control unit interface for communicating between the control unit and the projector, wherein the first control unit interface receives the projector parameters, via the second projector interface;
a second control unit interface for communicating between the control unit and the capture device, wherein the second control unit interface communicates an orientation capture command from the control unit to the capture device; and
a third control unit interface for communicating between the control unit and the projector, wherein the third control unit interface communicates projection commands to the projector, via the first projector interface, to display the uncorrected graphic and the pre-distorted graphic, and to project the uncorrected image and the corrected image, respectively,
wherein deriving the transformation includes maximizing a product of a first area fraction representing a projection area aligned with the projection screen, and a second area fraction representing pixels utilized in displaying the pre-distorted graphic.

11. An image projection system according to claim 7, further comprising a host computer interface for communicating between a host computer and the control unit, wherein a host computer communicates a presentation to the control unit, and the control unit applies the transformation to graphics corresponding to the presentation.

12. A keystone correction method for a projector which includes a display unit including a plurality of pixels, the method comprising:
displaying an uncorrected graphic on the display unit utilizing pixels in the display unit;
projecting the uncorrected graphic from the display unit onto a projection screen to form an uncorrected image;
capturing an orientation of the uncorrected image relative to the projection screen;
deriving a transformation so as to transform the uncorrected graphic into a pre-distorted graphic for projection from the display unit onto the projection screen so as to form a corrected image counterpart with an orientation more aligned with the projection screen than the orientation of the uncorrected image and such that the pre-distorted graphic utilizes more pixels in the display unit in displaying the pre-distorted graphic than a second pre-distorted graphic, wherein the second pre-distorted graphic is calculated by transforming the uncorrected graphic such that the second pre-distorted graphic forms a second corrected image with a maximum rectangular area inside the uncorrected image projected from the display unit onto the projection screen;
applying the transformation to the uncorrected graphic so as to obtain the pre-distorted graphic;
displaying the pre-distorted graphic on the display unit utilizing pixels in the display unit; and
projecting the pre-distorted graphic from the display unit onto the projection screen to form the corrected image counterpart.

13. A keystone correction method according to claim 12, wherein capturing the orientation of the uncorrected image relative to the projection screen is performed by a camera.

14. A keystone correction method according to claim 12, wherein deriving the transformation includes maximizing a number of pixels in the display unit utilized to display the pre-distorted graphic.

15. A keystone correction method for a projector which includes a display unit including a plurality of pixels, the method comprising:
displaying an uncorrected graphic on the display unit utilizing pixels in the display unit;

projecting the uncorrected graphic from the display unit onto a projection screen to form an uncorrected image;

capturing an orientation of the uncorrected image relative to the projection screen;

deriving a transformation so as to transform the uncorrected graphic into a pre-distorted graphic for projection from the display unit onto the projection screen so as to form a corrected image counterpart with an orientation more aligned with the projection screen than the orientation of the uncorrected image and such that the pre-distorted graphic utilizes more pixels in the display unit in displaying the pre-distorted graphic than a second pre-distorted graphic, wherein if formed, the second pre-distorted graphic would be formed by transforming the uncorrected graphic such that the second pre-distorted graphic forms a second corrected image with a maximum rectangular area inside the uncorrected image when projected from the display unit onto the projection screen;

applying the transformation to the uncorrected graphic so as to obtain the pre-distorted graphic;

displaying the pre-distorted graphic on the display unit utilizing pixels in the display unit; and projecting the pre-distorted graphic from the display unit onto the projection screen to form the corrected image counterpart, wherein deriving the transformation includes maximizing a product of a first area fraction representing a projection area aligned with the projection screen, and a second area fraction representing pixels utilized in displaying the pre-distorted graphic.

16. A keystone correction method according to claim 12, wherein the transformation is further applied to graphics corresponding to a presentation received from a host computer.

17. An image projection system according to claim 1, wherein deriving the transformation includes determining a product of a first area fraction representing a projection area aligned with the projection screen, and a second area fraction representing pixels utilized in displaying the pre-distorted graphic.

18. An image projection system according to Claim 1, wherein the pre-distorted graphic utilizes less pixels than a third pre-distorted graphic, wherein if formed, the third pre-distorted graphic would be formed by transforming the uncorrected graphic so that the third pre-distorted graphic utilizes a maximum number of pixels in the display unit while forming a third corrected image with a rectangular area inside the uncorrected image when projected from the display unit onto the projection screen.

19. A keystone correction method according to Claim 12, wherein the pre-distorted graphic utilizes less pixels than a third pre-distorted graphic, wherein if formed, the third pre-distorted graphic would be formed by transforming the uncorrected graphic so that the third pre-distorted graphic utilizes a maximum number of pixels in the display unit while forming a third corrected image with a rectangular area inside the uncorrected image when projected from the display unit onto the projection screen.

* * * * *